United States Patent
Tamura

(10) Patent No.: US 9,871,949 B2
(45) Date of Patent: Jan. 16, 2018

(54) PSEUDO HALFTONE IMAGE PROCESSING USING A THRESHOLD MATRIX TO FORM DOTS NOT ROTATIONAL SYMMETRIC ON A 90 DEGREE BASIS

(71) Applicant: CANON KABUSHIKI KAISHA, Tokyo (JP)

(72) Inventor: Hirokazu Tamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/352,457

(22) Filed: Nov. 15, 2016

(65) Prior Publication Data
US 2017/0150009 A1    May 25, 2017

(30) Foreign Application Priority Data

Nov. 20, 2015    (JP) .................................. 2015-227583

(51) Int. Cl.
*H04N 1/405* (2006.01)
*H04N 1/387* (2006.01)
*G06K 15/02* (2006.01)

(52) U.S. Cl.
CPC ....... *H04N 1/4053* (2013.01); *G06K 15/1876* (2013.01); *G06K 15/1881* (2013.01); *H04N 1/3877* (2013.01); *H04N 1/4055* (2013.01); *G06K 2215/0071* (2013.01); *H04N 2201/0094* (2013.01)

(58) Field of Classification Search
None
See application file for complete search history.

(56) References Cited

FOREIGN PATENT DOCUMENTS

JP    2010-220145 A    9/2010

*Primary Examiner* — Scott A Rogers
(74) *Attorney, Agent, or Firm* — Canon USA, Inc. I.P. Division

(57) ABSTRACT

An image processing apparatus which performs image processing for print processing, including: a pseudo halftone processing unit configured to perform pseudo halftone processing by dithering with respect to an input image, and generate a halftone image constituted by plural dots, and a threshold matrix holding unit configured to hold a threshold matrix used for the pseudo halftone processing, wherein in the threshold matrix, thresholds are arranged such that the halftone image has a density region in which dots to be formed depending on a density of the input image are not rotational symmetric on a 90° basis, and orientations of the dots differ from each other in the density region.

15 Claims, 29 Drawing Sheets

PSEUDO HALFTONE IMAGE PROCESSING USING A THRESHOLD MATRIX TO FORM DOTS NOT ROTATIONAL SYMMETRIC ON A 90 DEGREE BASIS

BACKGROUND OF THE INVENTION

Field of the Invention

The present invention generally relates to pseudo-halftoning processing, and more particularly, to a technique in consideration of a relationship between a shape of a dot formed by dithering and image rotation processing.

Description of the Related Art

Various types of image recording systems are used in image forming apparatuses, such as copiers and printers. For example, in an electrophotographic system, a latent image is formed on a photoconductive drum using a laser beam, the latent image is developed with a charged coloring material (hereinafter, "toner"), a developed toner image is transferred to and fixed to a paper sheet, whereby an image is recorded. Such an electrophotographic image forming apparatus often can output at a small number of tones in pixel units. Therefore, in order to stably and accurately reproduce halftone expression of image data of a printing target, image data with a large number of tones in pixel units is subject to pseudo halftone processing for expressing tones using plural pixels in order to reduce the number of tones in pixel units.

For the purpose of printing finish processing, such as bookbinding and sorting, or changing cassettes upon running out of paper sheets, image data may be stored in a storage device, such as memory or hard disk drive, in the image forming apparatus, and then subject to rotation processing on a 90° basis before being printed out.

Regarding storage of image data, storing image data expressed by a small number of tones which has been subject to the pseudo halftone processing is advantageous compared with image data with a large number of tones for small capacitance of the storage device and short writing time to the storage device.

However, the related art image forming apparatuses have the following problems. If image data which has been subject to pseudo halftone processing is printed out after performing rotation processing on a 90° basis, image density is changed as compared with a print output result of image data which is not subject to rotation processing. This is because, in an image converted into a dot pattern corresponding to a certain specific density, vertical and horizontal orientations of the dot pattern are exchanged by rotation processing in the pseudo-halftoning processing, whereby a horizontally long dot is changed into a vertically long dot, for example. A change in the dot pattern produces a change in a latent image pattern obtained by laser irradiation on a photoconductive drum in, for example, an electrophotographic printing process. This is because rotation of the image data means that a laser scanning direction and a rotation direction of the photoconductive drum are exchanged. For example, it is assumed that a certain image forming apparatus has high reproducibility of a horizontally long dot (i.e., a horizontally long dot is output denser than a vertically long dot with the same density value) corresponding to a specific laser scanning direction or a specific rotation direction of a photoconductive drum. In this case, a dot formation process is changed by the rotation of the image and if, for example, a dot which is horizontally long before rotation is changed into a vertically long dot, density of an image formed on a paper sheet at a transfer step is changed (i.e., becomes thinner in the example above). A change in density caused by a change in the dot formation process accompanying rotation of the image may occur also in other recording methods (e.g., an inkjet recording method).

If the orientation of print output is known in advance, to which direction the image is to be rotated can be known in advance, and creating a dot pattern converted in the pseudo-halftoning processing in consideration of the rotational direction is also possible. For example, if it is known in advance that an image is printed out after being rotated 90°, a printed matter of density equivalent to that without rotation can be obtained by forming a dot pattern rotated 270° even if the image is rotated 90° later. However, it is difficult to determine the rotational direction in advance in all the cases.

Some image forming apparatuses, such as copiers and printers, are provided with plural sheet feed cassettes for feeding paper sheets. Such image forming apparatuses provided with plural sheet feed cassettes often have an automatic cassette change function. The automatic cassette change function is a function to automatically switch to another sheet feed cassette accommodating paper sheets of the same type when a certain sheet feed cassette runs out of paper sheets. This function reduces time and effort of a user who switches setting of the sheet feed cassette which is a sheet feeding source. With the automatic cassette change function, for example, the paper sheet may be fed in a landscape direction first and, may be changed to a portrait direction after the sheet feed cassette which is a sheet feeding source is changed upon running out of paper sheets. In this case, rotation processing of the image data is required for the print output and the problem of the change in density described above may occur. However, it is difficult to know in advance the timing at which the sheet feed cassettes are changed due to running out of paper sheets under a real usage environment.

To address the problem of density variation accompanying rotation processing of the image data which has been subject to pseudo halftone processing, a technique of applying a dithering matrix with high rotation tolerance with respect to image data which has been subject to pseudo-halftoning processing by dithering is proposed. Japanese Patent Laid-Open No. 2010-220145 describes forming a dot pattern with no difference between a dot gain of an image at a rotation angle of 0° and a dot gain of the same image rotated 90°. Specifically, described is a technique of performing pseudo-halftoning processing by dithering using a dithering matrix for forming a dot in which the same continuous number of pixels exist both in a scanning direction and in a sub-scanning direction (i.e., a dot in which continuous number of pixels in certain directions are rotational symmetric). With this technique, even if the image data is subject to rotation processing after pseudo-halftoning processing, image data with equivalent density can be obtained before and after the rotation processing.

However, since the technique described in Japanese Patent Laid-Open No. 2010-220145 has a restriction in a change in the size of the dot corresponding to density, a linear change in density is difficult. This is because, although density is increased continuously typically by increasing the size of the dot gradually, a dot shape which does not necessarily follow the rule of the rotational symmetric described above is formed in a process of increasing the pixels constituting the dot ("ON pixels") one by one. As a result, in a density region in which a dot violating a rule of rotational symmetric is formed, a change in density is caused accompanying the rotation processing. Alternatively, if control of a change in density is considered to be important and it is tried not to form a dot violating a rule of rotational symmetric, then the number of ON pixels must be increased at once in a process of increasing the size of the dot, whereby continuity of density and continuity of tone are impaired.

SUMMARY OF THE INVENTION

According to an aspect of the present invention, an image processing apparatus which performs image processing for print processing, including: a pseudo halftone processing unit configured to perform pseudo halftone processing by dithering with respect to an input image, and generate a halftone image constituted by plural dots, and a threshold matrix holding unit configured to hold a threshold matrix used for the pseudo halftone processing, wherein in the threshold matrix, thresholds are arranged such that the halftone image has a density region in which dots to be formed depending on a density of the input image are not rotational symmetric on a 90° basis, and orientations of the dots differ from each other in the density region.

Further features of the present invention will become apparent from the following description of exemplary embodiments with reference to the attached drawings.

BRIEF DESCRIPTION OF THE DRAWINGS

FIG. 5B illustrates a resultant image of dither processing using the threshold matrix, and FIG. 5C illustrates an image which is the resultant image subject to rotation processing.

FIG. 6A illustrates a threshold matrix with rotation tolerance according to a first embodiment, FIG. 6B is a resultant image of dither processing using the threshold matrix, and FIG. 6C illustrates an image which is the resultant image subject to rotation processing.

FIG. 7A illustrates a conventional threshold matrix, FIG. 7B illustrates a resultant image of dither processing using the threshold matrix, and FIG. 7C illustrates an image which is the resultant image subject to rotation processing.

FIG. 8A illustrates a threshold matrix with rotation tolerance according to the first embodiment, FIG. 8B is a resultant image of dither processing using the threshold matrix, and FIG. 8C illustrates an image which is the resultant image subject to rotation processing.

FIG. 9 illustrates exemplary control of a threshold matrix so that a shape of a dot becomes rotationally symmetric at 180° when the total number of pixels constituting the dot is an even number.

FIG. 10A illustrates a threshold matrix with rotation tolerance according to a second embodiment, FIG. 10B is a resultant image of dither processing using the threshold matrix, and FIG. 10C illustrates an image which is the resultant image subject to rotation processing.

FIG. 11A illustrates a threshold matrix with rotation tolerance according to the second embodiment, FIG. 11B is a resultant image of dither processing using the threshold matrix, and FIG. 11C illustrates an image which is the resultant image subject to rotation processing.

FIG. 12A illustrates a threshold matrix with rotation tolerance according to a third embodiment, FIG. 12B is a resultant image of dither processing using the threshold matrix, and FIG. 12C illustrates an image which is the resultant image subject to rotation processing.

FIG. 13A illustrates a threshold matrix with rotation tolerance according to the third embodiment, FIG. 13B is a resultant image of dither processing using the threshold matrix, and FIG. 13C illustrates an image which is the resultant image subject to rotation processing.

DESCRIPTION OF THE EMBODIMENTS

Hereinafter, embodiments for implementing the present invention will be described with reference to the accompanying drawings. Configurations described in the following embodiments are illustrative only, and not restrictive.

First Embodiment

A multi-function printer (MFP) having a color printing function by an electrophotographic system using toner of four colors (CMYK) will be described as an example in the present embodiment, but the image forming apparatus to which the present invention is applicable is not limited to the same. The present invention is applicable also to a printer having a monochrome printing function, or an image forming apparatus employing another recording system, such as an inkjet recording system.

Figure 1:
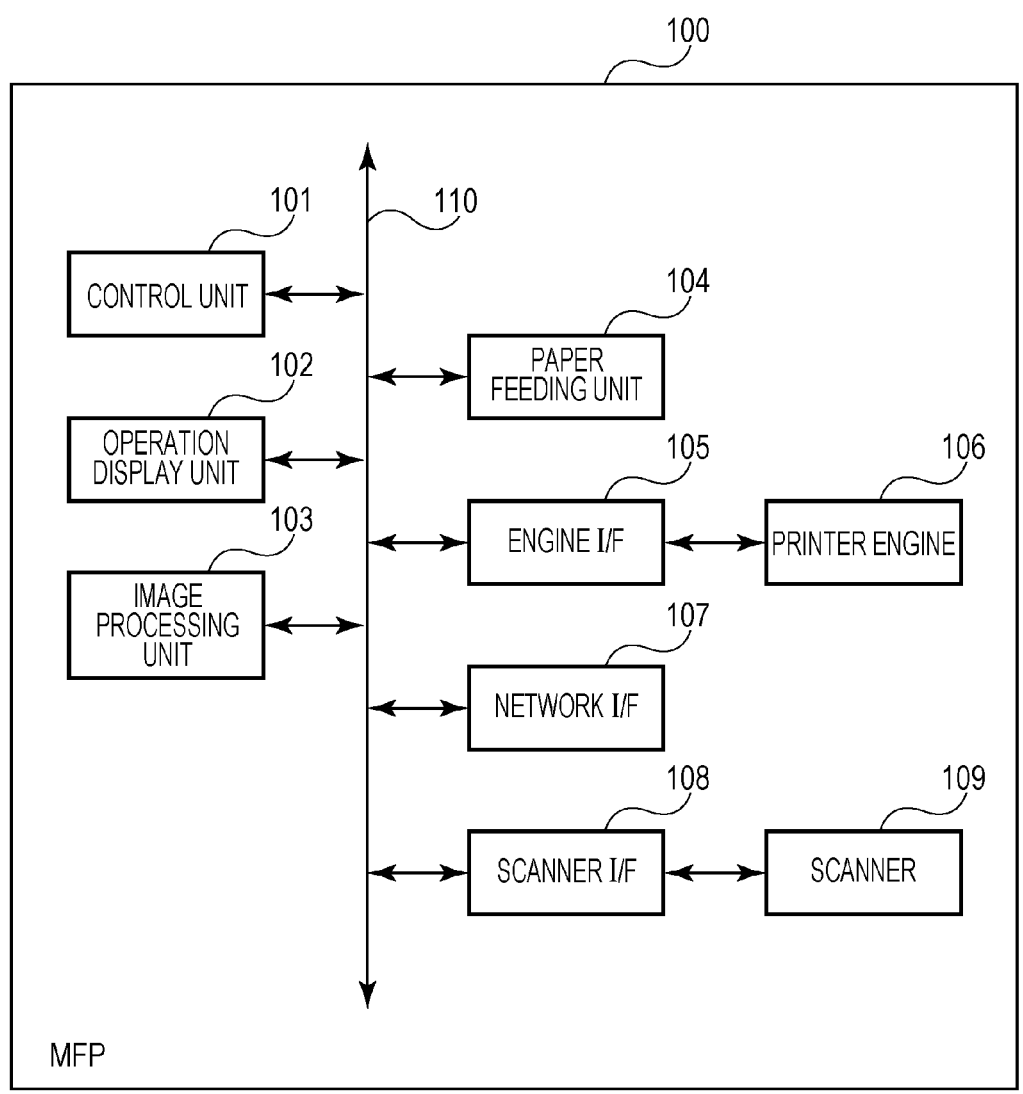
FIG. 1 is a block diagram illustrating a basic configuration of a multi-function printer (MFP).

FIG. 1 is a block diagram illustrating a basic configuration of a MFP. A MFP 100 includes a control unit 101, an operation display unit 102, an image processing unit 103, a paper feeding unit 104, an engine I/F 105, a printer engine 106, a network I/F 107, a scanner I/F 108, a scanner 109, and a bus 110.

The control unit 101 is a module for controlling the entire MFP 100, and includes a CPU, ROM, RAM, etc. The control unit 101 performs various types of processing based on a program stored in the ROM. A system boot program, a control program of the printer engine 106, and various types of data, such as character data and character code information, is stored in the ROM. The RAM is used as a work area of the CPU in which various programs are developed, and is used also as a temporary storage of received image data.

The operation display unit 102 is constituted by a liquid crystal display having a touch panel function, for example, and performs various types of display under the control of the control unit 101. The operation display unit 102 displays, for example, an operation screen for receiving designation of print conditions, including layout, enlargement, reduction, and rotation at the time of printing, and receives an input operation from a user. The operation display unit 102 is used also to display information about various setting states of the MFP 100 and processing being performed (e.g., an error status). Further, the operation display unit 102 is used by the user to make various instructions, such as change of settings.

The image processing unit 103 performs necessary image processing with respect to the input image data and generates image data in a format compatible with that of the printer engine 106. Details thereof will be described later.

The paper feeding unit 104 includes plural sheet feed cassettes, and supplies paper sheets to the printer engine 106 under the control of the control unit 101. Each of the sheet feed cassettes may accommodate paper sheets of different size (e.g., A4 and A3), or paper sheets of the same size but different directions (e.g., A4, a landscape (horizontal) and a portrait (vertical) directions).

The engine I/F 105 is an interface on which a command etc. for controlling the printer engine 106 is output and input. The printer engine 106 receives image data generated in a predetermined format from the image processing unit 103, and forms an image on a surface of a paper sheet fed from the paper feeding unit 104. In electrophotography, printing to a surface of paper which is a recording medium is completed through processings of exposure, development, transfer, and fixing. The network I/F 107 is an interface for connecting the MFP 100 to an unillustrated network. The MFP 100 receives image data which becomes a printing target from a host computer (not illustrated) via the network and the network I/F 107. The scanner I/F 108 is an interface to which the scanner 109 is connected, and transfers the image data read by the scanner 109 to the image processing unit 103. The bus 110 functions as a data path among the components described above. The components of the MFP 100 described above are illustrative only, and the MFP 100 may include, for example, HDD as a mass storage device for storing various types of data, etc., an external interface for connecting to an external apparatus, such as a camera and a portable terminal, etc.

Figure 2:
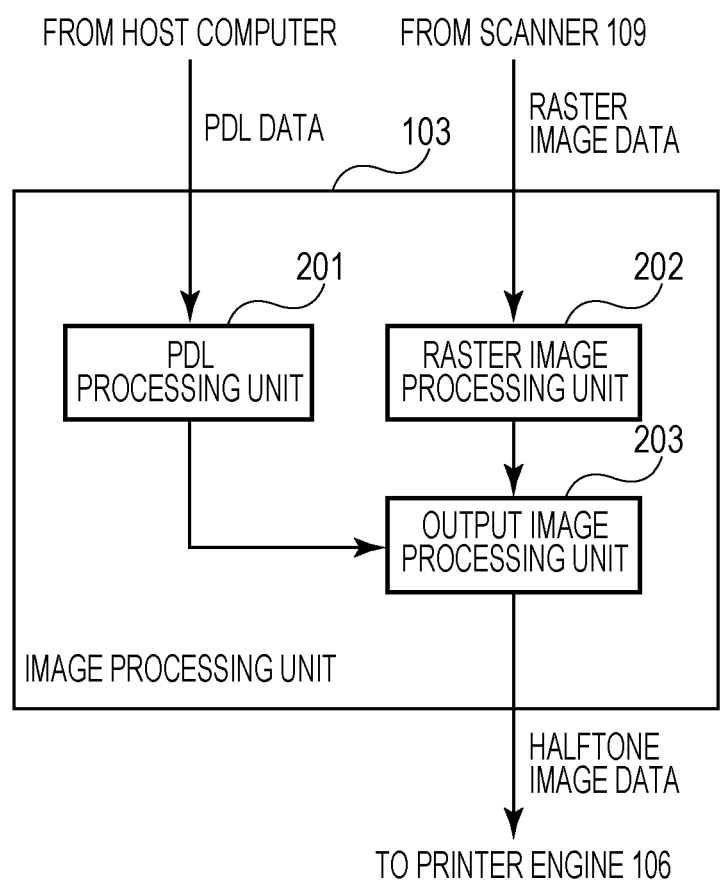
FIG. 2 is a block diagram illustrating an internal configuration of an image processing unit.

Next, the image processing unit 103 will be described in detail. FIG. 2 is a block diagram illustrating an internal configuration of the image processing unit 103. The image processing unit 103 includes a PDL processing unit 201, a scanned image processing unit 202, and an output image processing unit 203. These function units which constitute the image processing unit 103 are implemented when the CPU executes a predetermined program stored in the ROM. A part or all of these function units may be implemented by a dedicated IC.

First, print processing (PDL printing) based on image data input from the host computer will be described. In the host computer, digital document data, such as a page layout document, a word processor document, and a graphic document, is generated by various applications. The generated digital document data is converted into drawing command data called a page description language (PDL) (hereinafter, "PDL data") by a printer driver. The PDL data typically includes drawing data for each attribute, such as an image, graphic and text, as well as information about print setting, such as print resolution, the number of print copies, a page layout, and a printing order. The PDL data input in the MFP 100 via the network I/F 107 is transmitted to the PDL processing unit 201 in the image processing unit 103.

The PDL processing unit 201 performs analysis processing of the received PDL data, generates an object of a drawing target, and performs rasterizing processing to generate data in a bit map format in which an image is expressed by colored dots (hereafter, referred to as "raster image data.") At this time, information about the above-described print setting included in the PDL data is also extracted. The generated raster image data and the extracted print setting information are transmitted to the output image processing unit 203.

The output image processing unit 203 performs image processing with respect to the raster image data for print processing, such as color conversion processing, density correction processing, rotation processing, and pseudo halftone processing, based on the print setting information. The image data converted into a format compatible with that of the printer engine 106 by pseudo-halftoning processing is transmitted to the printer engine 106 via the engine I/F 105 and is printed. In electrophotography, a rotating photoconductive drum is irradiated with laser (exposure), charged toner is made to adhere to the photoconductive drum (development), a toner image on the photoconductive drum is transferred to a paper sheet via a transfer belt (transfer), and the paper sheet bearing the toner is pressed with heat and pressure (fixing), whereby printing is completed.

The PDL print processing is completed in the process described above.

Next, print processing (copy printing) based on the image data obtained with the scanner 109 will be described. The scanner 109 optically scans a document placed on an unillustrated document table or an automatic document feeder (ADF), measures intensity of reflected light and transmitted light, and performs analog-to-digital conversion to obtain the raster image data. The raster image data obtained here typically is image data of a RGB color space. The raster image data obtained by the scanner 109 is transmitted to the raster image processing unit 202.

The raster image processing unit 202 performs predetermined image processing, such as shading correction, in-line correction, and color correction, with respect to the received raster image data. The raster image data subject to the predetermined image processing is transmitted to the output image processing unit 203. The output image processing unit 203 performs the above-described pseudo-halftoning processing etc., and then the printer engine 106 performs the print processing.

The copy printing processing is completed in the process described above.

There is a case where not PDL data but raster image data in the form of JPEG or TIFF is input from the host computer. In that case, the image data, even if it is transmitted from the host computer, is transmitted to the raster image processing unit 202.

Figure 3:
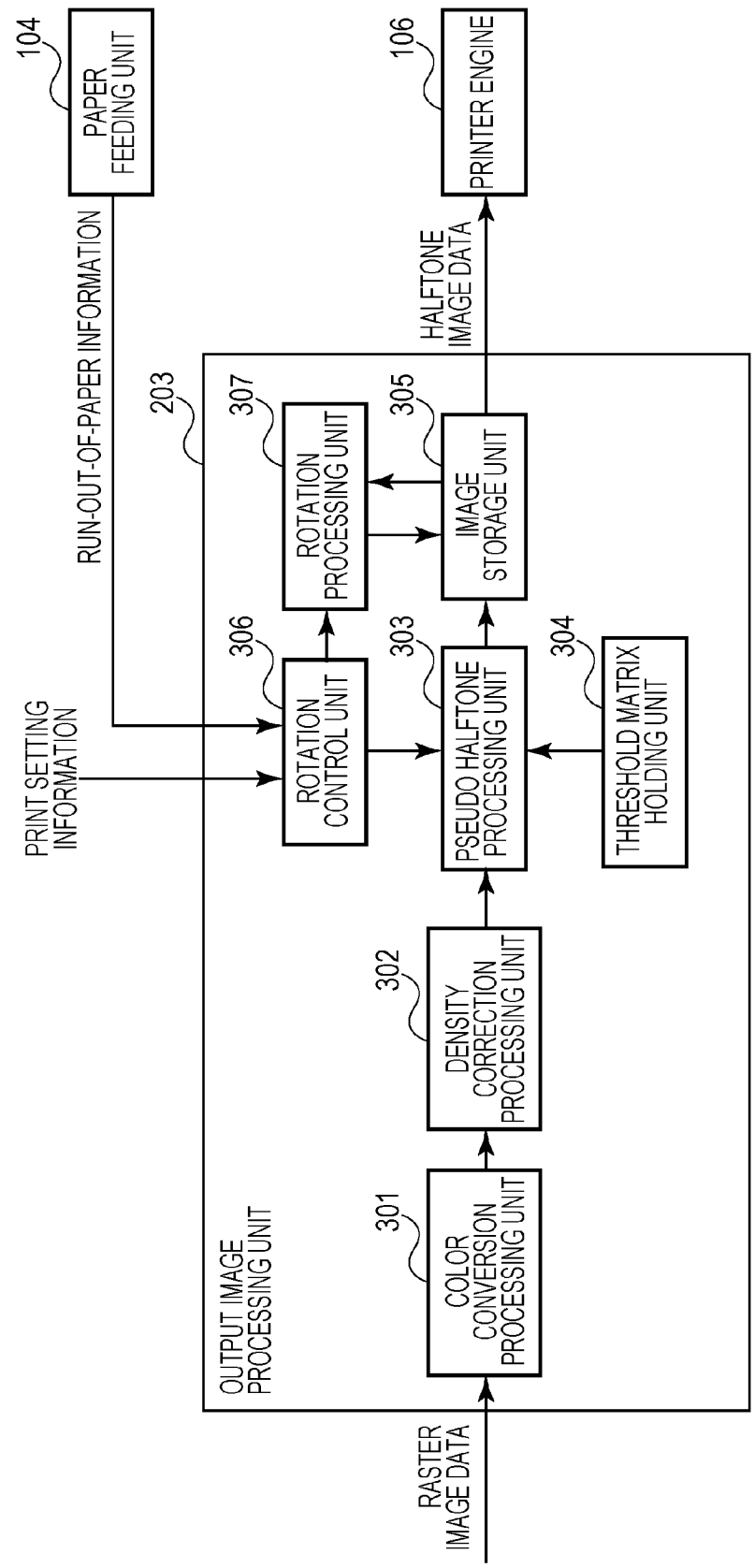
FIG. 3 is a block diagram illustrating an internal configuration of an output image processing unit.

Next, the output image processing unit 203 will be described in detail. FIG. 3 is a block diagram illustrating an internal configuration of the output image processing unit 203. The output image processing unit 203 includes a color conversion processing unit 301, a density correction processing unit 302, a pseudo halftone processing unit 303, a threshold matrix holding unit 304, an image storage unit 305, a rotation control unit 306, and a rotation processing unit 307.

The color conversion processing unit 301 performs color conversion processing for converting the color space of the raster image data input from the PDL processing unit 201 or the raster image processing unit 202 (here RGB) into the color space corresponding to the toner of 4 colors used in the printer engine 106 (here CMYK). This color conversion processing is performed using, for example, a color conversion table, etc. in which RGB values and CMYK values are correlated.

The density correction processing unit 302 performs processing to correct density depending on density characteristics inherent in the printer engine 106 (gamma correction processing) with respect to the raster image data of the CMYK color space which has been subject to the color conversion processing. The density correction processing is performed by using a density correction table in which input density levels and output density levels are correlated for each color of CMYK, or by obtaining the density by function calculation.

The pseudo halftone processing unit 303 performs pseudo halftone processing with respect to the raster image data which has been subject to density correction, and generates image data expressed by halftone dots (i.e., halftone image data, hereinafter, "HT image data"). The printer engine 106 can typically output only at a small number of tones, such as 2, 4 and 16. Therefore, the pseudo halftone processing is performed typically by error diffusion or dithering to enable stable halftone expression also in the printer engine 106 which can output only at a small number of tones. It is presumed that pseudo-halftoning processing is performed by dithering in the present embodiment. Here, dithering will be described briefly. In dithering, a threshold matrix in which different thresholds are disposed in a matrix of a predetermined size is used. This threshold matrix is sequentially developed in a tile shape on the input image data, and multi-value input image data (input pixel values) is compared with the threshold. If the input pixel value is larger than the threshold, the pixel is turned on, and if the input pixel value is smaller than the threshold, the pixel is turned off. In this manner, a pseudo halftone image (a halftone image) is expressed. At that time, the threshold matrix to be applied in accordance with an attribute of an object is changed. For example, a threshold matrix for low screen ruling is used for an object which gives priority to continuity of tone, such as a photograph, and a threshold matrix for high screen ruling is used for an object which gives priority to resolution, such as characters. These threshold matrices are prepared in advance, held by the threshold matrix holding unit 304, and referred to when required. Details of the threshold matrix held by the threshold matrix holding unit 304 will be described later. The HT image data generated by the pseudo halftone processing unit 303 is stored in the image storage unit 305 (constituted by the RAM etc.) in the output image processing unit 203.

The rotation control unit 306 controls the rotation processing unit 307. Specifically, the rotation control unit 306 determines whether to perform rotation processing and, if the rotation processing is performed, determines how many degrees the dot is to be rotated based on the print setting information and out-of-paper-sheet information, and transmits the determination result to the rotation processing unit 307 as a rotation control signal. Hereinafter, cases where it is determined that rotation processing be necessary and examples of rotation angles will be provided.

- a case where vertical inversion in front and rear sides is designated in double-sided printing: 180°
- a case where N in 1 printing and bookbinding printing are designated: 90°
- a case where a rotation sorting function is effective: 90° or 270°
- a case where an automatic cassette change function is effective (e.g., a sheet feed cassette for A4R is changed to a sheet feed cassette for A4 upon running out of paper sheets): 90° or 270°.

Here, the double-sided printing means printing images on both sides of a paper sheet, N in 1 printing means printing plural pages on a paper sheet, and bookbinding printing means allocating pages and printing images to make a two-fold book. The rotation sorting function means a function to discharge sheets one by one alternately in opposite directions. If rotation processing is not performed, a rotation control signal designating the rotation angle of 0° is generated and is transmitted to the rotation processing unit 307.

The rotation processing unit 307 reads the HT image data from the image storage unit 305 in accordance with the rotation control signal from the rotation control unit 306, and applies rotation processing. The HT image data which has been subject to the rotation processing is transmitted to the printer engine 106 via the image storage unit 305, and is subject to print processing.

Figure 4:
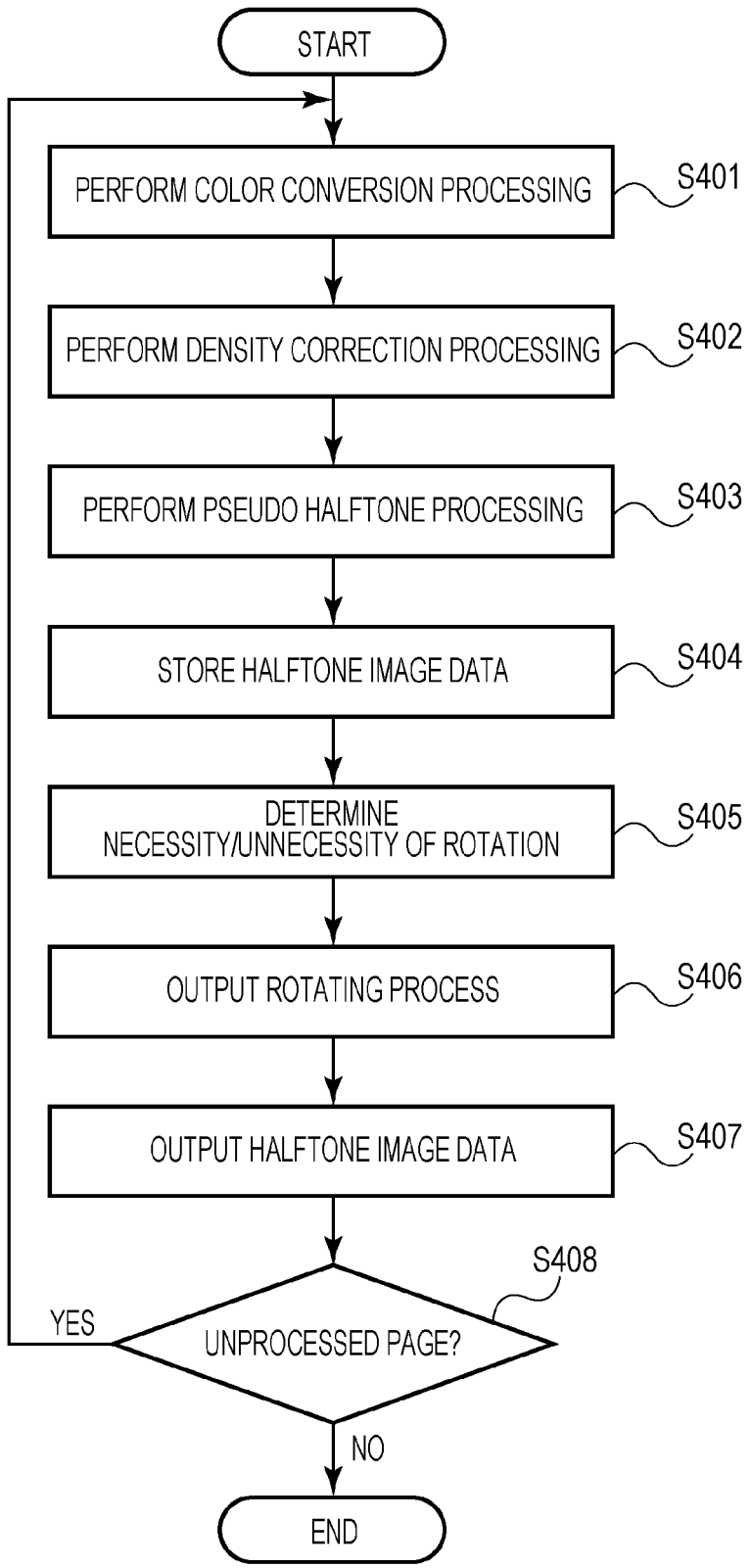
FIG. 4 is a flowchart illustrating a processing flow in the output image processing unit.

FIG. 4 is a flowchart illustrating a processing flow in the output image processing unit 203. A series of processing is implemented when a control program stored in the ROM is developed in the RAM and the CPU executes the control program in the control unit 101. Here, PDL printing in which processes up to printing including rotation processing are performed without intermission in response to the print command from the host computer will be described as an example. The following processing will be started when the input PDL data is converted into raster image data and input in the output image processing unit 203 by rasterization processing in the PDL processing unit 201.

In step 401, the color conversion processing unit 301 performs color conversion processing with respect to data of the 1st page of the input raster image data to convert from the RGB color space into the CMYK color space. The raster image data of the CMYK color space which has been subject to the color conversion processing is transmitted to the density correction processing unit 302.

In step 402, the density correction processing unit 302 performs density correction processing for each plate of CMYK with respect to the raster image data which has been subject to the color conversion processing. The raster image data which has been subject to density correction is transmitted to the pseudo halftone processing unit 303.

In step 403, the pseudo halftone processing unit 303 performs the pseudo halftone processing by dithering (hereinafter, "dither processing") for each plate of CMYK with respect to the raster image data which has been subject to the density correction processing using the threshold matrix held in the threshold matrix holding unit 304. Since the number of tones per pixel of the HT image data is reduced to a small number of tones, such as binary, capacitance of the image storage unit 305 and a processing speed during storage are advantageous as compared with a case where image data before being subject to dither processing is stored as it is.

In step 404, the HT image data generated by the dither processing in step 403 is temporarily stored in the image storage unit 305.

In step 405, the rotation control unit 306 determines whether rotation processing is necessary. If double-sided printing, N in 1 printing, and bookbinding printing are designated in the above-described examples, or if the rotation sorting function is effective, whether rotation processing is necessary is determined based on the print setting information. In this case, information about print setting included in the PDL data is referred to in the PDL printing, and information about the print setting set on the operation display unit 103 is referred to if an image read with a scanner is to be printed. If the automatic cassette change function is effective, whether rotation processing is necessary is determined in response to out-of-paper-sheet information transmitted from the paper feeding unit 104. The determination result becomes a rotation control signal representing either of 4 directions on a 90° basis about 0° which means no rotation (0°, 90°, 180°, and 270° clockwise), and is transmitted to the rotation processing unit 307.

In step 406, the rotation processing unit 307 rotates HT image data stored in the image storage unit 305 in accordance with the rotation control signal.

In step 407, the HT image data subject to rotation processing as necessary is output to the printer engine 106.

In step 408, it is determined whether the input raster image data includes an unprocessed page. If an unprocessed page is included, the routine returns to step 401, where processing is continued with respect to the next page as a process target page. If all the pages have been processed, the process leaves the loop.

The processing flow in the output image processing unit 203 has been described. In the present embodiment, a case where each processing to print output including rotation processing is performed without intermission is described as an example, but this is not restrictive. For example, the HT image data may be generated and stored using a BOX saving function first, and then, at desirable timing by the user, it may be determined whether rotation of the saved HT image data is necessary and the saved HT image data may be rotated before being printed out. In this case, the HT image data is stored generally in a mass storage device, such as unillustrated HDD instead of the RAM in the output image processing unit 203.

Next, the threshold matrix used in the dither processing in the pseudo halftone processing unit 303 will be described in detail. In the present embodiment, it is assumed that the image data subject to dither processing is rotated on a 90° basis. First, a conventional threshold matrix, a resultant image of dither processing (a HT image), and a HT image subject to the rotation processing are described with reference to FIGS. 5A to 5C.

Figure 5A:
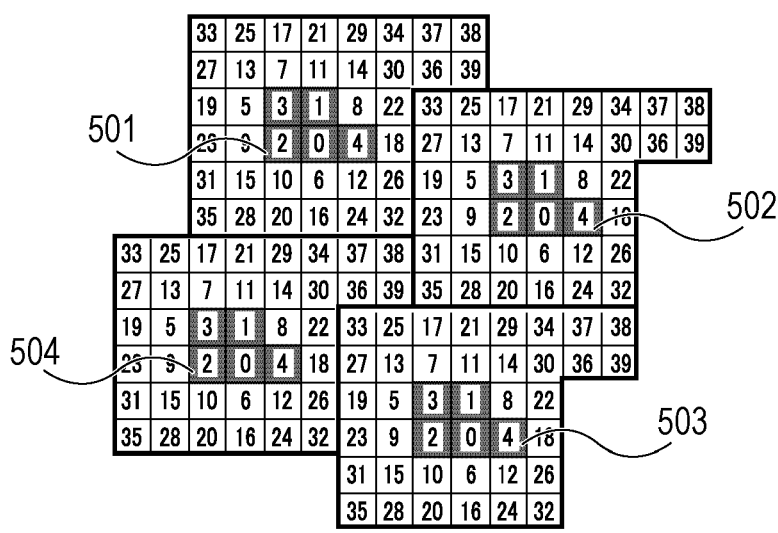
FIG. 5A illustrates a conventional threshold matrix.
Figure 5B:
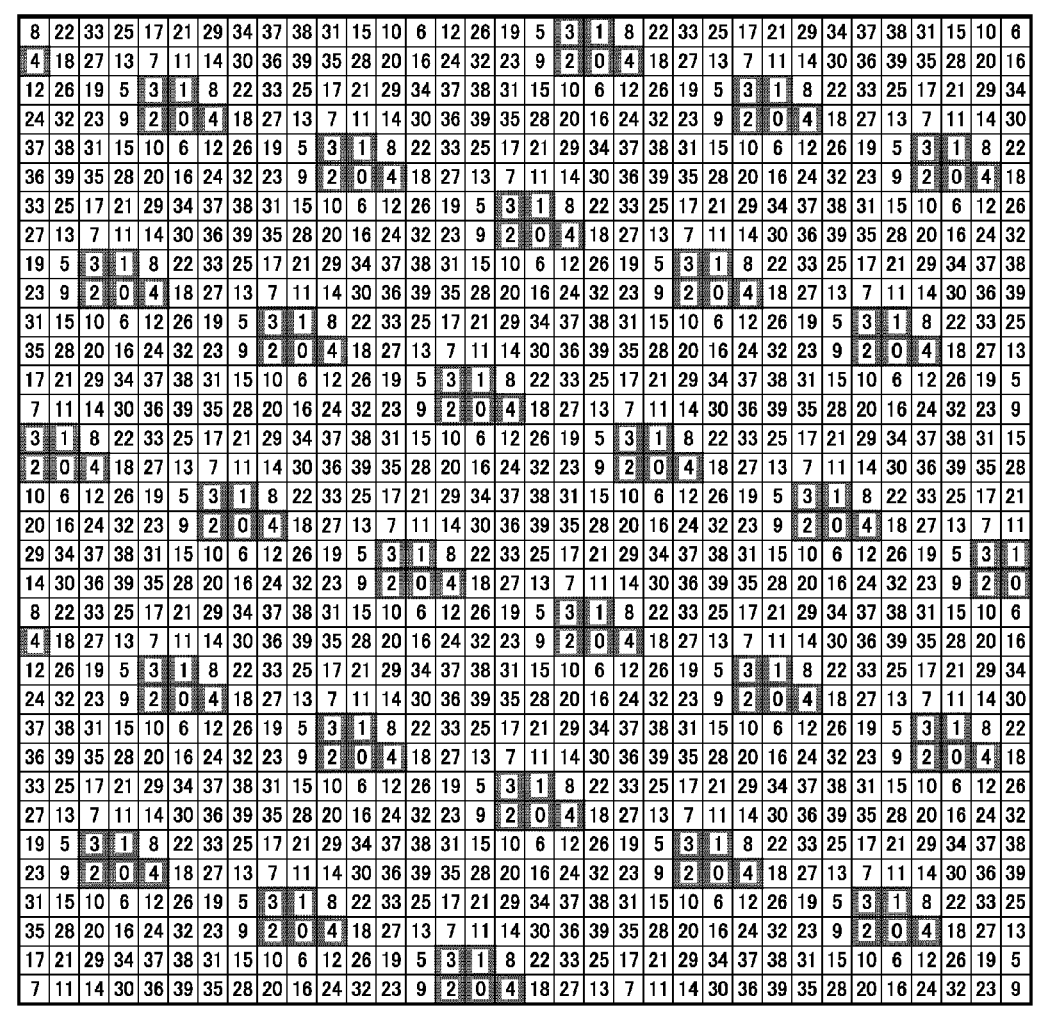
Figure 5C:
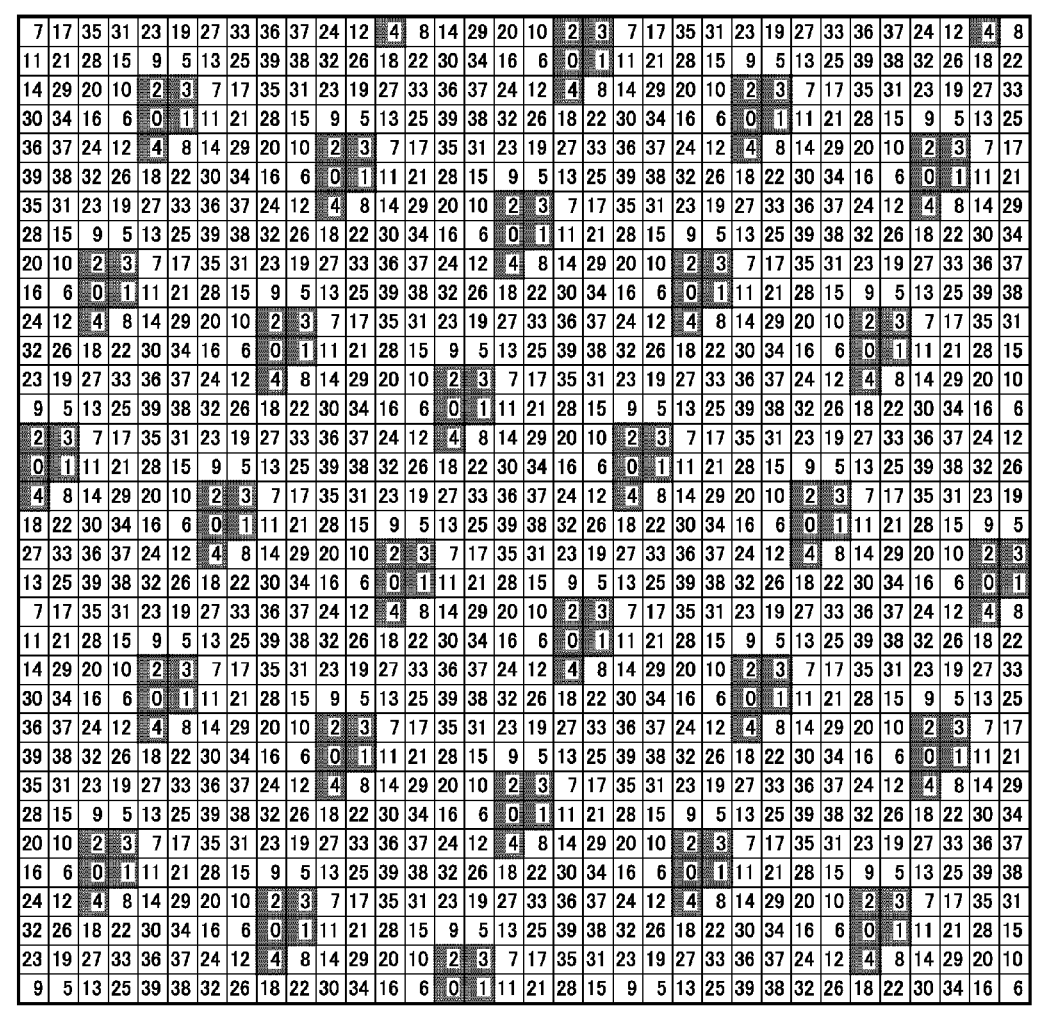

FIG. 5A is an example of an orthodox threshold matrix having a screen angle of 72° and the screen ruling of 190 lpi when applied to image data of 1200 dpi. The threshold matrix illustrated in FIG. 5A is constituted by four submatrices. Numerals in the submatrices (0 to 39) represent thresholds to be compared with the pixel values (i.e., the density values) of the input image. In this case, quantization in 40 tones, i.e., up to maximum density of 40 is possible. Pixels having values greater than the thresholds become ON pixels and form a halftone dot (hereinafter, "dot"). As the size of the dot becomes large, density of the image increases. The number of expressible tones can be increased by increasing the size of the submatrix. For example, it is only necessary to arrange the numerals of from 0 to 254 in the submatrices for the quantization of 8 bits, i.e., 256 tones. The threshold matrix illustrated in FIG. 5A is developed as one unit on the input image data sequentially in a tile shape without space, and the image data is converted into a dot pattern. The threshold matrix used as a minimum unit is referred to as a "unit matrix" hereinafter. In the threshold matrix illustrated in FIG. 5A, dots obtained by applying the threshold matrix to flat input image data all of which pixel values (density values) are 5 are illustrated in gray. In this case, the pixel values exceed the threshold at positions where the thresholds are smaller than 5, and four dots 501 to 504 each consisting of five ON pixels appear. FIG. 5B illustrates a HT image obtained by applying the threshold matrix illustrated in FIG. 5A to the flat input image data all of which pixel values are 5 (a reference HT image of rotation processing; hereinafter, referred to as a "reference HT image.") FIG. 5C illustrates an image obtained by rotating the reference HT image of FIG. 5B 90° clockwise. When FIGS. 5B and 5C are compared, it turns out that the shape of the dot has been changed from horizontally long to vertically long. This may cause a change in density on a paper sheet obtained as a printed result before and after the rotation processing for the reason described in the background art. The problem of the change in density accompanying the rotation processing is caused due to a change in the shape of the formed dot, and thus the problem occurs only in a density region where the shape of the dot is not symmetric in vertical and horizontal directions. That is, in a flat input image all of which pixel values is 4, since a square dot consisting of four ON pixels is formed when the threshold matrix of FIG. 5A is applied, the shape of the dot is not changed due to rotation processing on a 90° basis. Therefore, the problem of change in density does not occur.

Figure 6A:
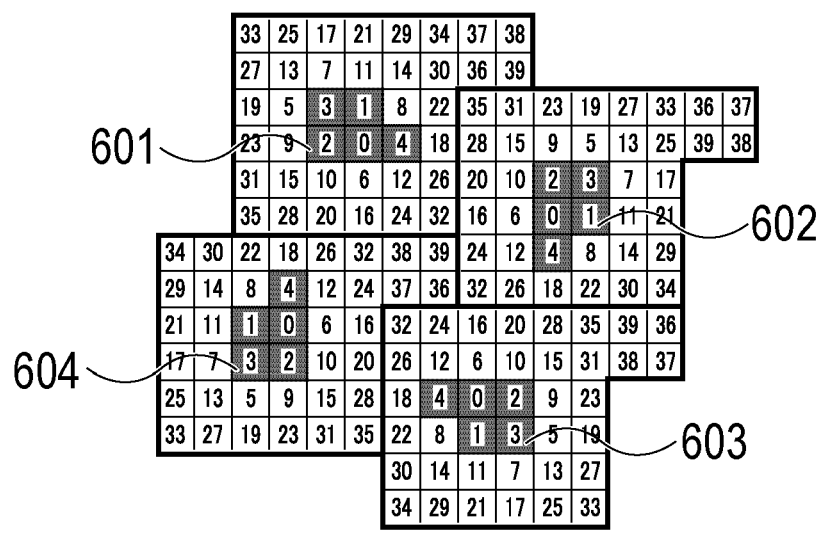
Figure 6B:
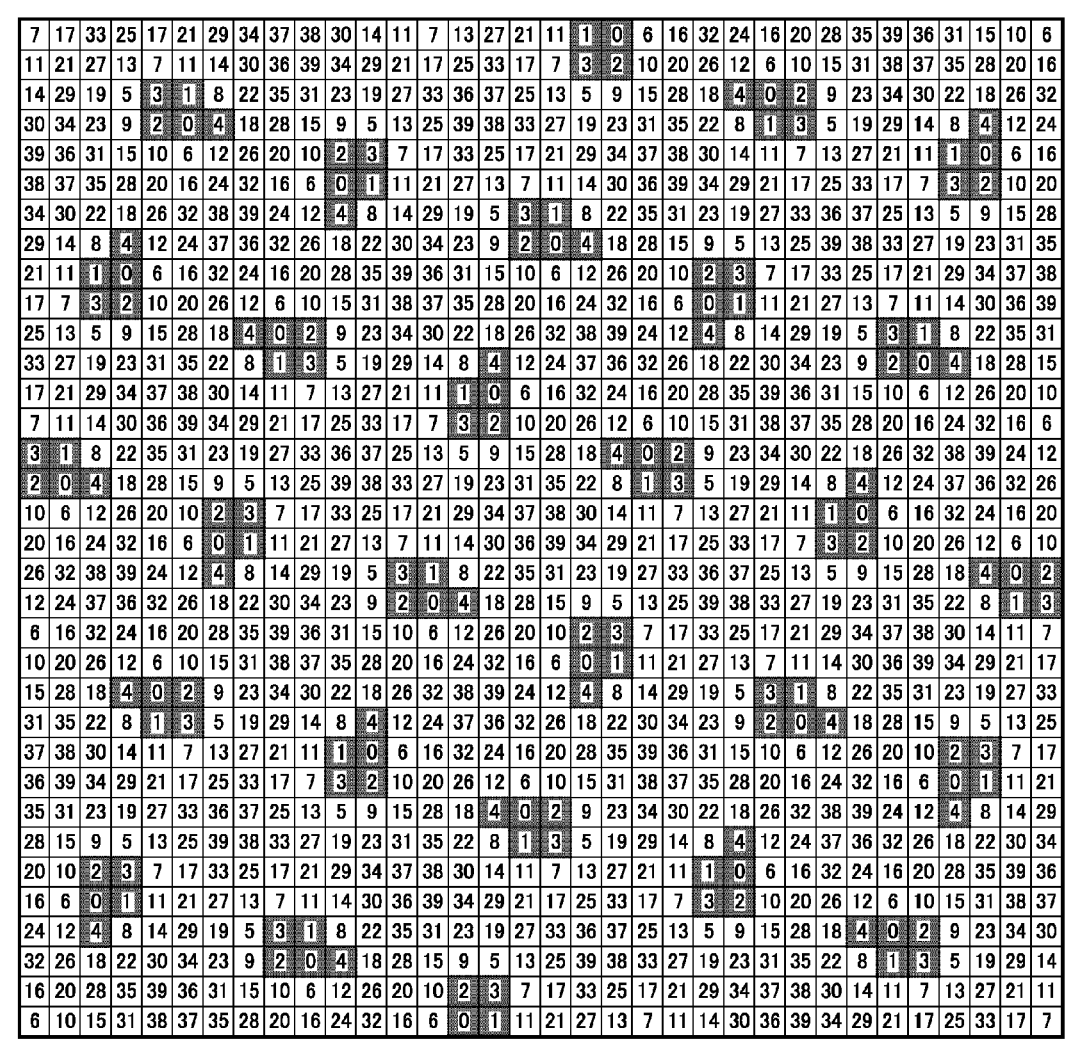
Figure 6C:
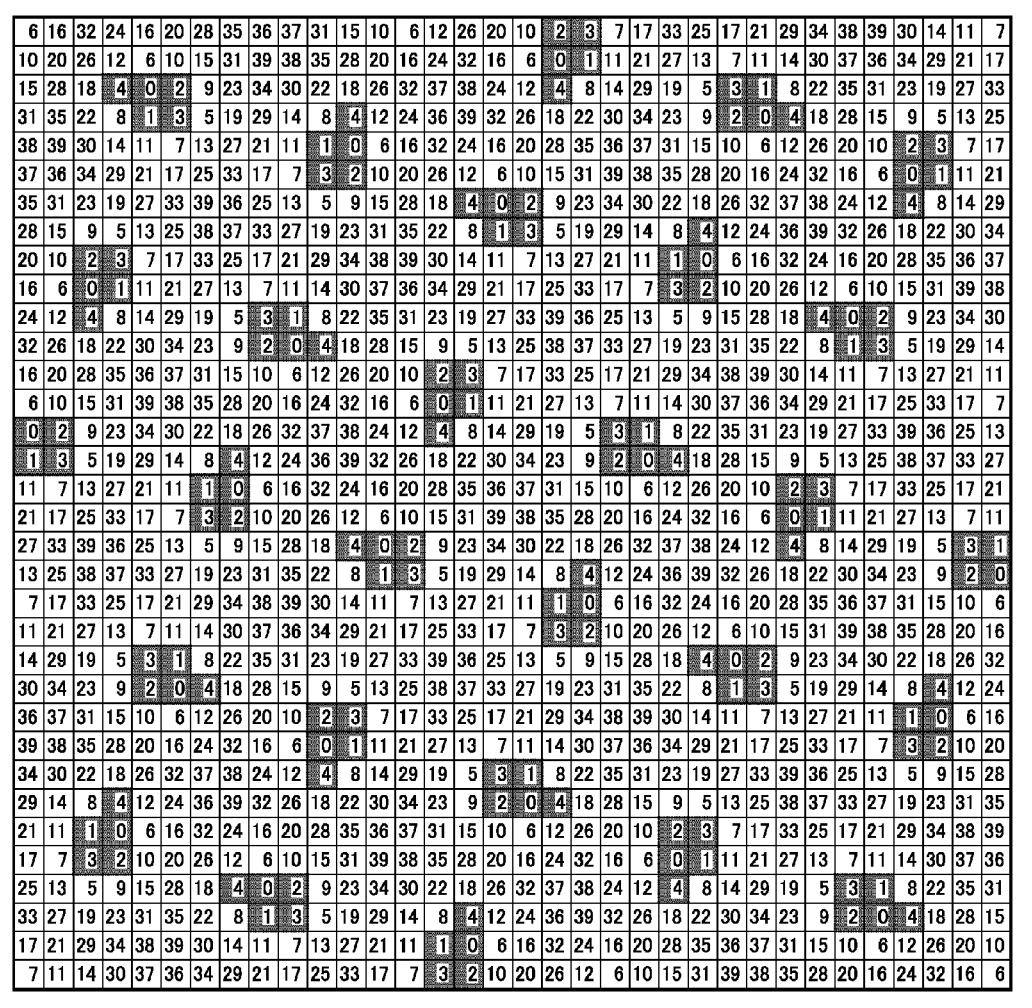

Next, a threshold matrix with rotation tolerance configured not to cause a change in density before and after the rotation processing according to the present embodiment will be described. FIG. 6A is an example of a threshold matrix with rotation tolerance according to the present embodiment. The threshold matrix is the same in size, screen ruling, and screen angle as those of the threshold matrix illustrated in FIG. 5A. In this case, quantization in 40 tones, i.e., up to a maximum density of 40 is possible. Four dots 601 to 604 obtained by applying the threshold matrix to the flat input image data all of which pixel values are 5 are illustrated in gray in the same manner as in FIG. 5A. If the threshold matrix of FIG. 6A is applied, the formed four dots 601 to 604 have the same shape but are oriented in four different directions at 90° (0°, 90°, 180° and 270°). In the present embodiment, the threshold matrix in which each threshold is arranged in the submatrix so that dots oriented in four different directions are formed is defined as a unit matrix. FIG. 6B is a resultant image obtained by applying the threshold matrix (i.e., the unit matrix) of FIG. 6A to the flat input image data all of which pixel values are 5 (a reference HT image). FIG. 6C illustrates an image obtained by rotating the reference HT image of FIG. 6B 90° clockwise. In this case, for example, even if a certain dot oriented in 0° is rotated 90°, another dot oriented in 270° is rotated 90° to be oriented in 0°, whereby the dot pattern to appear in the entire image is unchanged. The dots with respective orientations are replaced due to rotation and a relationship between the dots is unchanged. Therefore, a change in density on a printing paper sheet does not occur depending on whether rotation processing is performed (i.e., between a reference HT image and a 90°-rotated HT image).

Figure 7A:
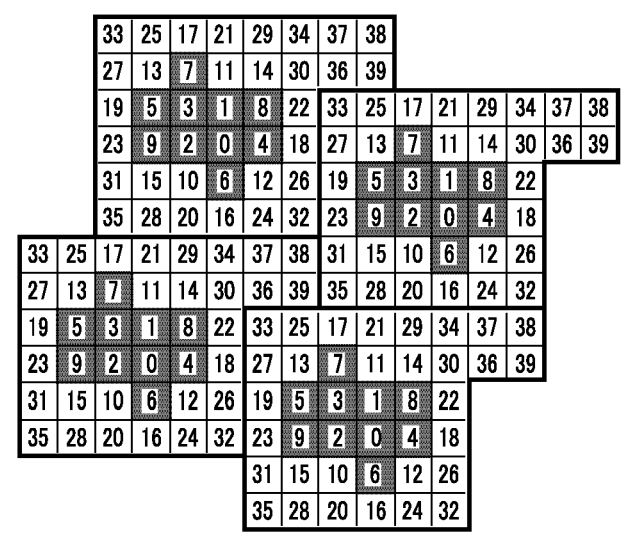
Figure 7B:
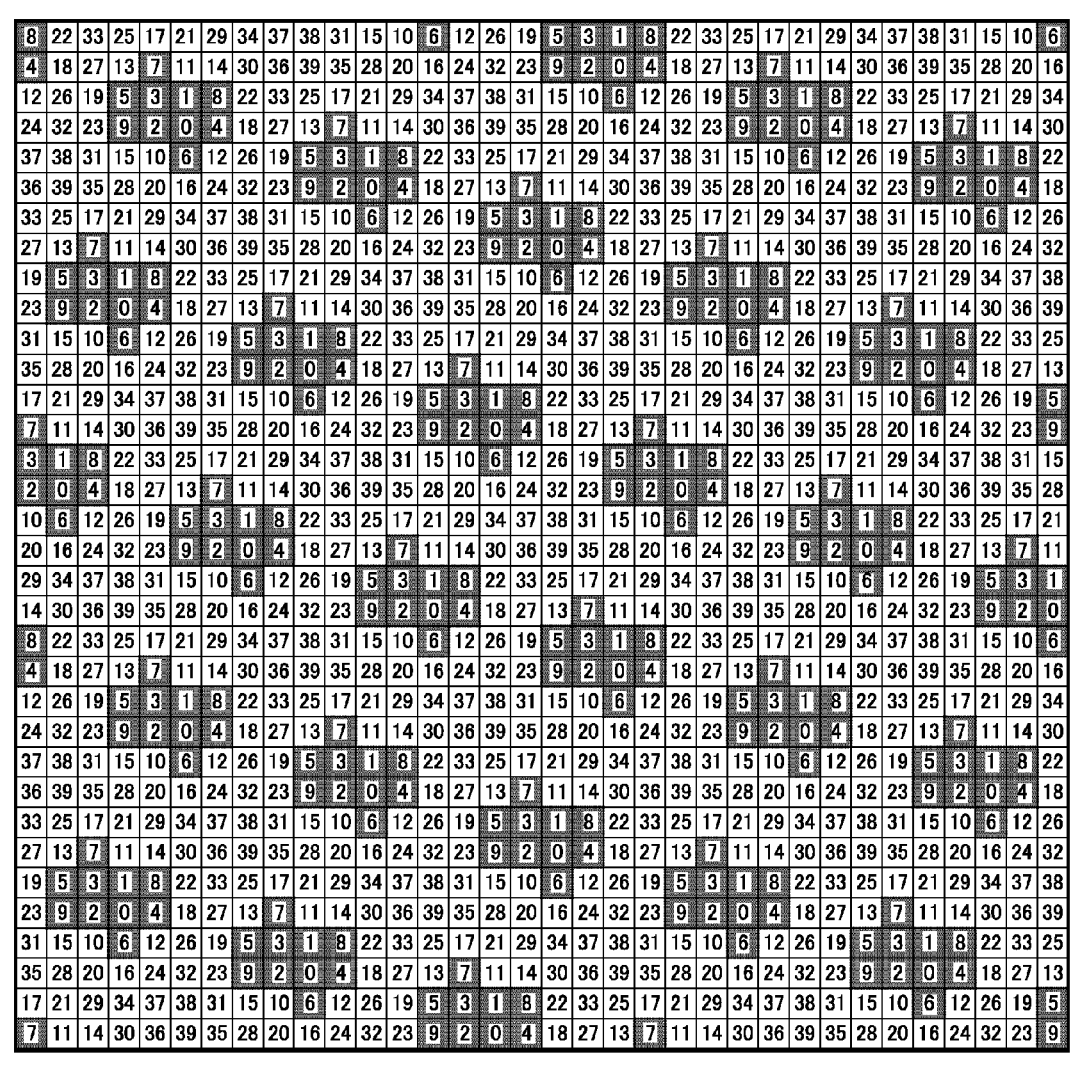
Figure 7C:
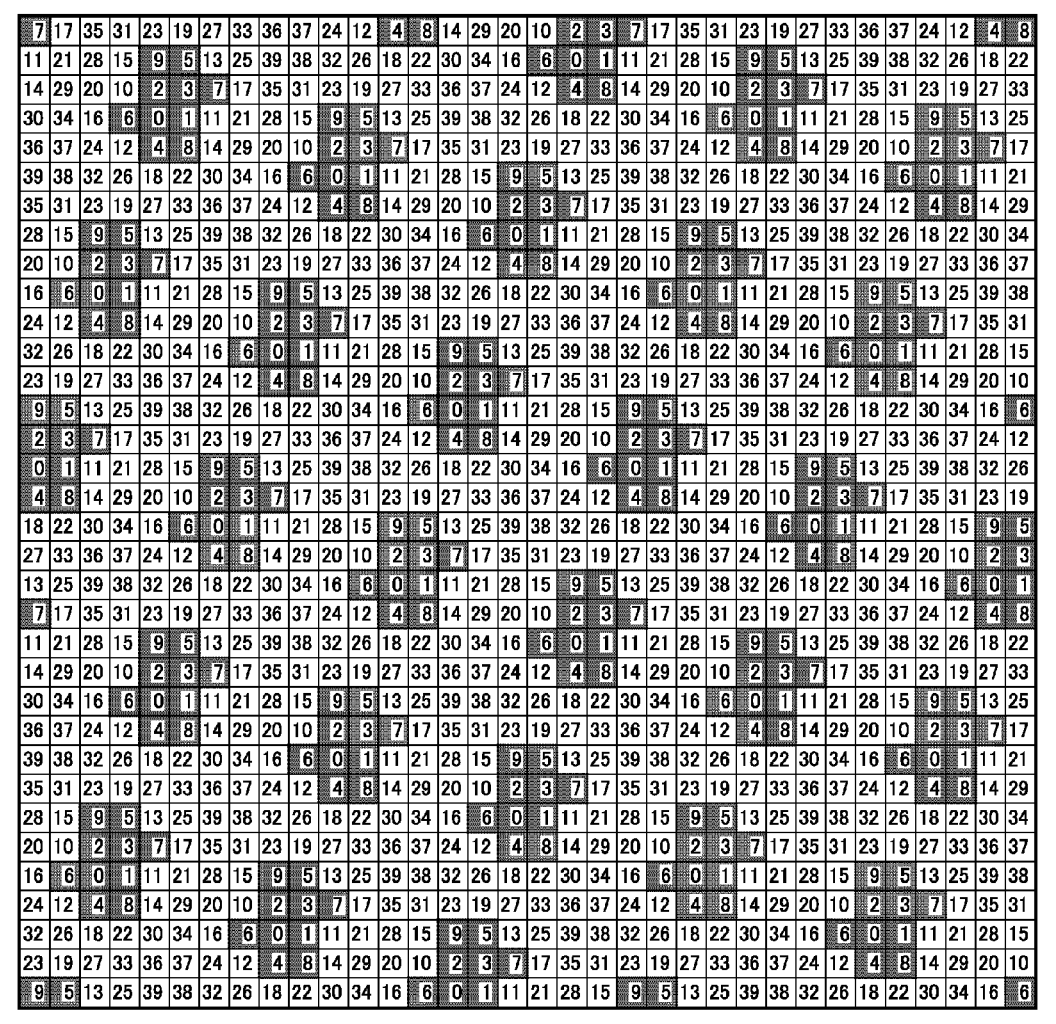
Figure 8A:
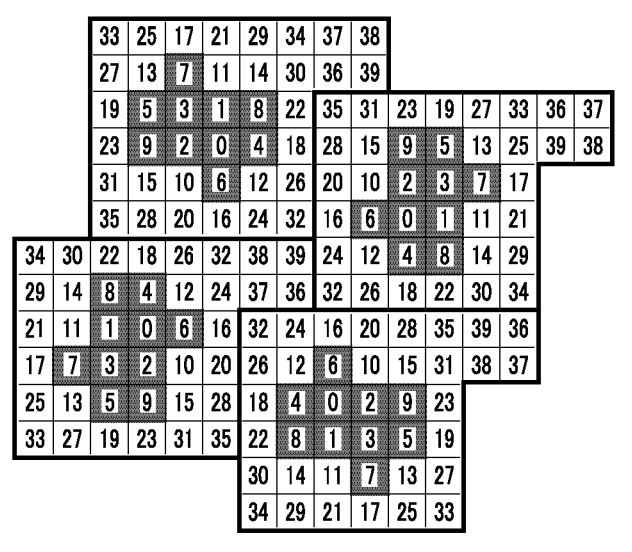
Figure 8B:
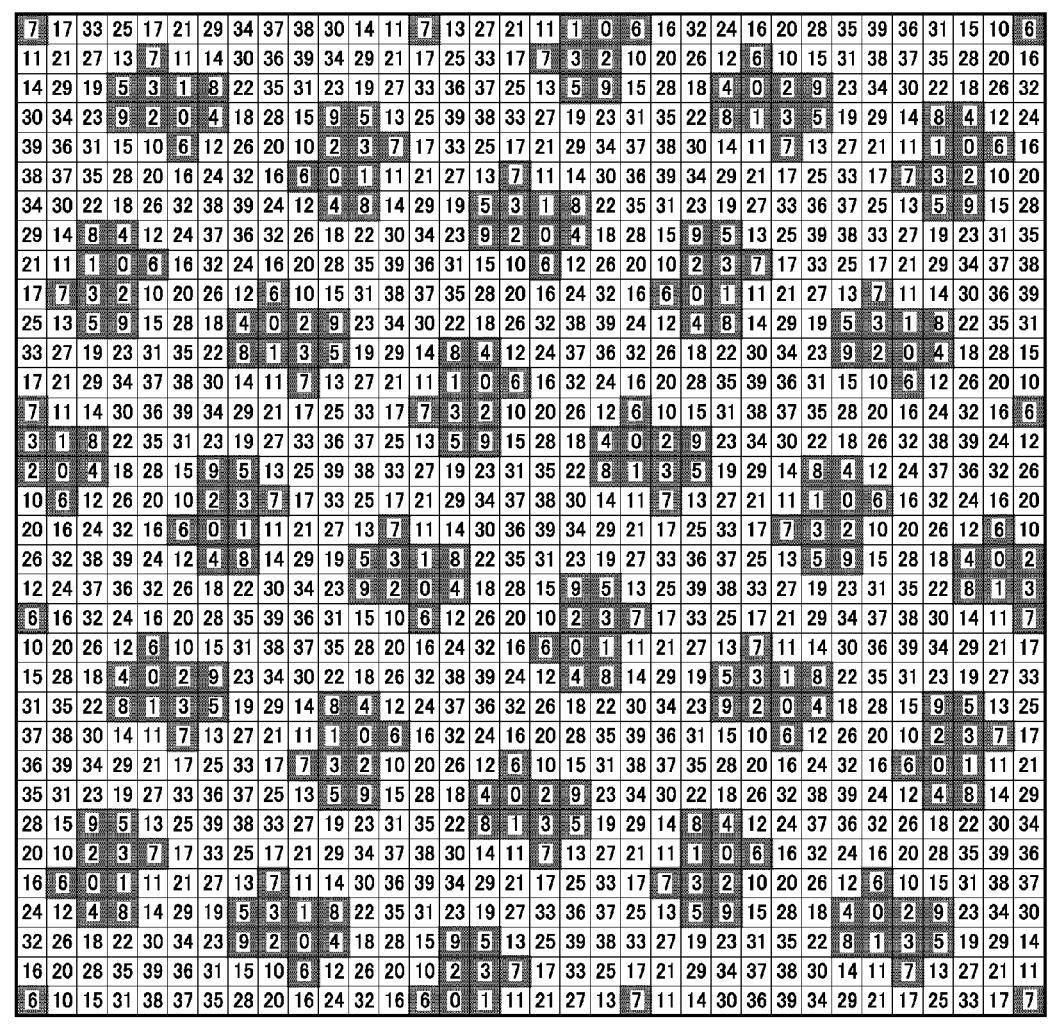
Figure 8C:
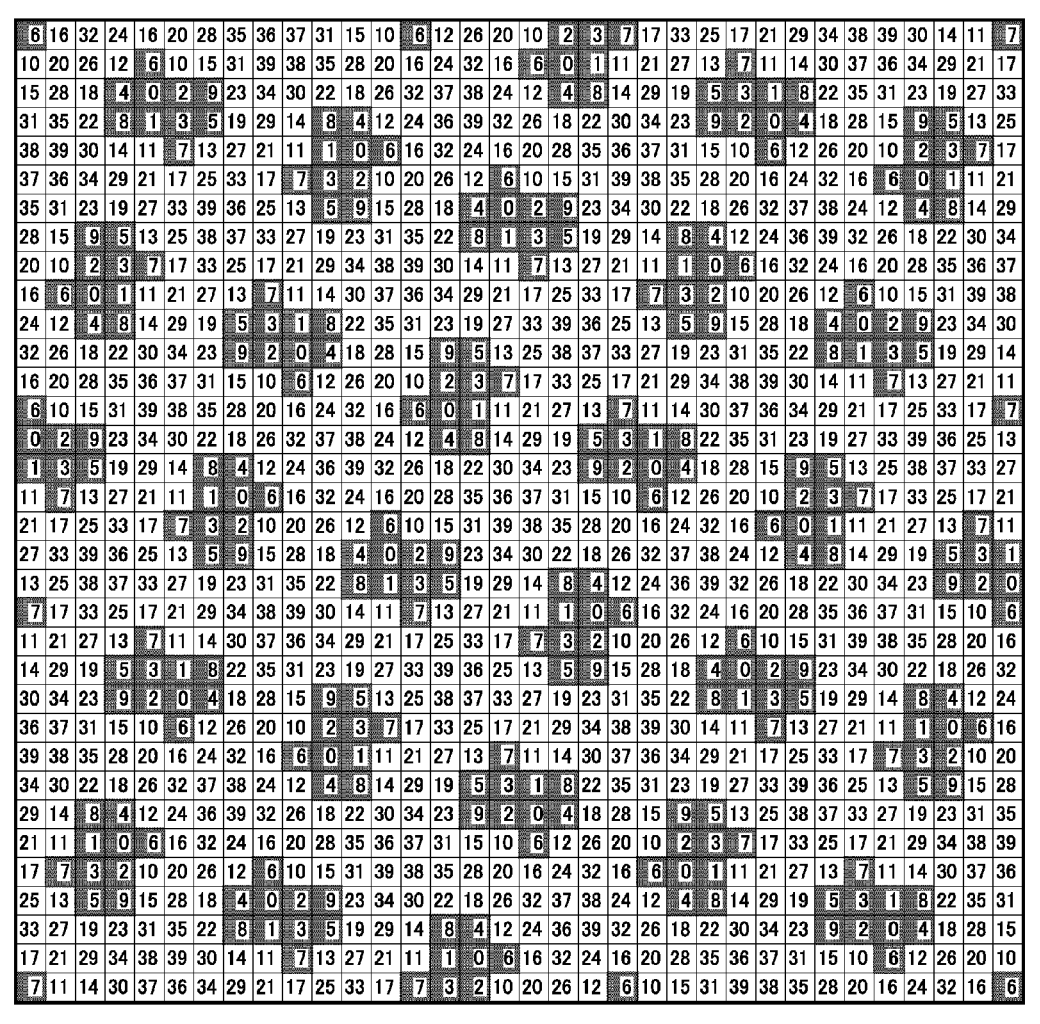

FIGS. 7A to 7C and 8A to 8C illustrate examples in which a conventional threshold matrix and the threshold matrix with rotation tolerance according to the present embodiment are applied to a flat input image all of which pixel values are 10. Specifically, FIG. 7A illustrates the same conventional threshold matrix as that illustrated in FIG. 5A, FIG. 7B is a resultant image obtained by applying the threshold matrix of FIG. 7A (a reference HT image), and FIG. 7C is the reference HT image rotated 90°. Similarly, FIG. 8A illustrates the same threshold matrix with rotation tolerance as that illustrated in FIG. 6A, FIG. 8B is a resultant image obtained by applying the threshold matrix of FIG. 8A (a reference HT image), and FIG. 8C is the reference HT image rotated 90°. In any case, the size of the dot (i.e., a dot area) is twice as those illustrated in FIGS. 5A to 5C and 6A to 6C. Regarding the formed dot pattern, in the case of FIGS. 7A to 7C where the conventional threshold matrix is used, the shapes of all the formed dots have been changed from vertically long to horizontally long due to rotation processing. In the case of FIGS. 8B and 8C where the threshold matrix with rotation tolerance is used, in both the reference HT image illustrated in FIG. 8B and the 90°-rotated HT image illustrated in FIG. 8C, the same number of vertically long dots and horizontally long dots exist, leaving no difference therebetween. At this density (pixel value: 10), since each dot is rotationally symmetric at 180°, orientations of the dots are only 0° and 90°. Therefore, uniformity of the dots on the surface is further increased. As the uniformity becomes higher, an output result with high image granulation and high quality can be obtained.

Figure 9:
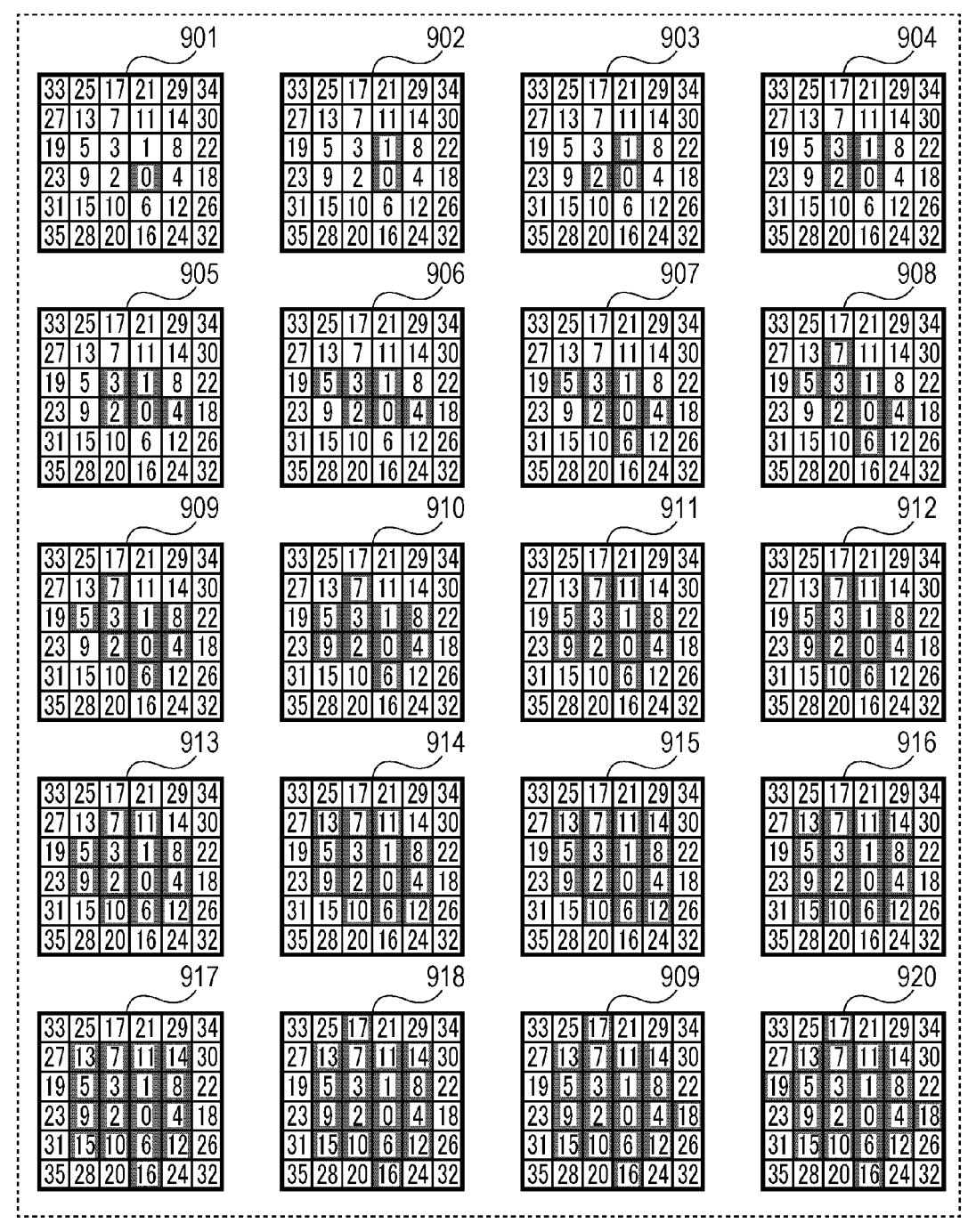

Here, if the total number of pixels which constitute the dot is an even number, it is always possible to form a dot shape of rotational symmetric at 180°. Exemplary control of a threshold matrix so that a shape of a dot becomes rotationally symmetric at 180° when the total number of pixels constituting the dot is an even number will be described. FIG. 9 illustrates submatrices 901 to 920 of 6×6 pixels constituting the threshold matrix in this case. The size of the dot illustrated in gray in each submatrix becomes larger as it approaches from 901 toward 920 (i.e., the number of ON pixels increases one by one), and the density increases. In the submatrix in which the total number of the pixels constituting the dot is an even number (902, 904, 906, 908, 910, 912, 914, 916, 918 and 920), the shape of the dot is always rotationally symmetric at 180°. In addition, since the dot in the submatrices of 904 and 916 is rotational symmetric at 90°, perfect uniformity of dot is obtained regarding density at this time (i.e., density values 4 and 16) before and after rotation of the image. In this example, when the total number of the pixels constituting a dot becomes an odd number (each of the submatrices of 903, 905, 907, 909, 911, 913, 915, 917 and 919), the four dots constituted by the unit matrix are oriented in four different directions at 90°. When the total number of the pixels constituting a dot becomes an even number, the four dots constituted by the unit matrix are oriented in two different directions at 180° or one direction.

The threshold matrix with rotation tolerance made under such a condition is held for each color of CMYK in the above-described threshold matrix holding unit 304. It is typically tried to suppress generation of moire between colors by using a threshold matrix with screen ruling or screen angles different for each color of CMYK. However, since suppression of generation of moire is not a feature of the present invention, specific description thereof is omitted.

Although the HT image data subject to dither processing is described as a 2-tone image representing ON and OFF on a pixel unit in the present embodiment, the HT image data subject to dither processing may be a 4-tone image, a 16-tone image, etc.

As described above, according to the present embodiment, the threshold matrix is configured such that the dots formed by dither processing are oriented in four different directions basically on a 90° basis. That is, when the shape of the dot is not rotational symmetric on a 90° basis, the dots are oriented in the four directions as described above, when the dot is rotational symmetric on a 180° basis, the dots are oriented in the two directions, and when the dot is rotational symmetric on a 90° basis, the dots are oriented in one direction (i.e., the same shape seen from any direction). Therefore, in dither processing, HT image data with reduced occurrence of a change in density accompanying rotation processing can be generated while keeping continuity of tone.

Second Embodiment

In the first embodiment, the rotation angles in the rotation processing are four on a 90° basis including 0°. This is because, rotation processing at 90° (or 270°) is required as the orientation is changed from the landscape to the portrait in rotation sorting or automatic cassette change. However, when it is limited to the double-sided printing, only 180° rotation processing is required. In the double-sided printing, whether an image is printed on the back side in the same vertical direction as that of the front side depends on the usage of the printed matter. For example, if binding positions of output plural pages are located on a side in the longitudinal direction, it is desirable that images on the back side and the front side are oriented in the same vertical direction, whereas if the binding positions are located on an upper side in the width direction, it is desirable that images on the back side and the front side are oriented in the opposite vertical directions. Neither of the cases requires rotation processing of 90° or 270°. Then, an embodiment in which the rotation angle of the rotation processing is limited to 180° and a threshold matrix with tolerance to rotation of 180° is used will be described as a second embodiment.

A basic configuration of the MFP 100, a configuration of the output image processing unit 203, etc., which are the same as those of the first embodiment will not be described. A threshold matrix used for dither processing which is a difference between the first embodiment and the second embodiment will be described mainly.

Figure 10A:
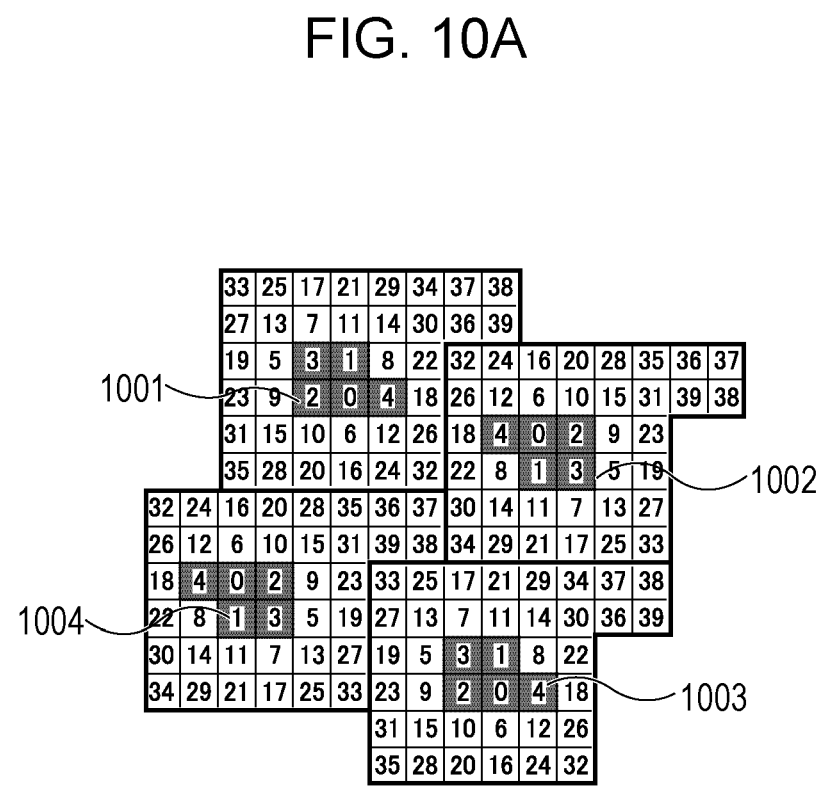
Figure 10B:
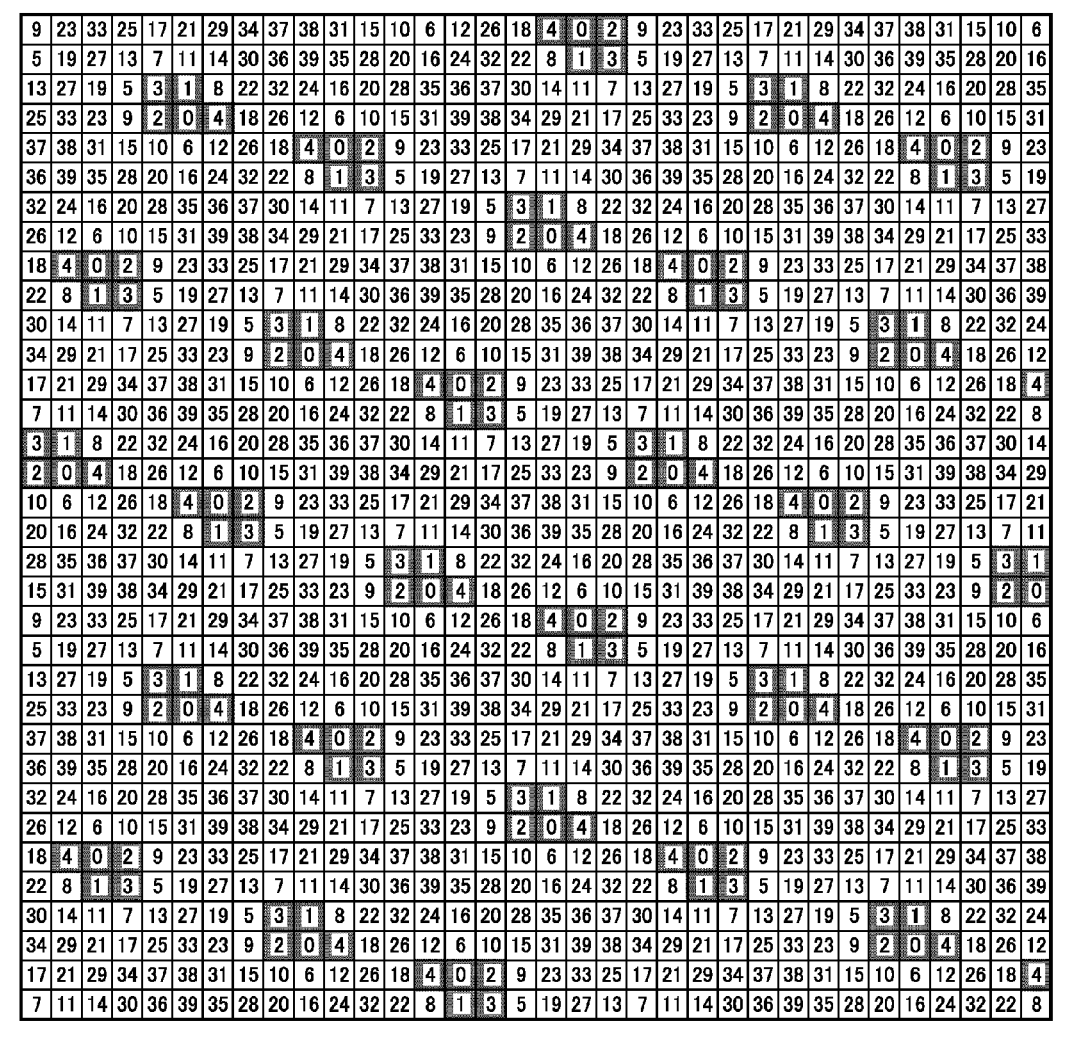
Figure 10C:
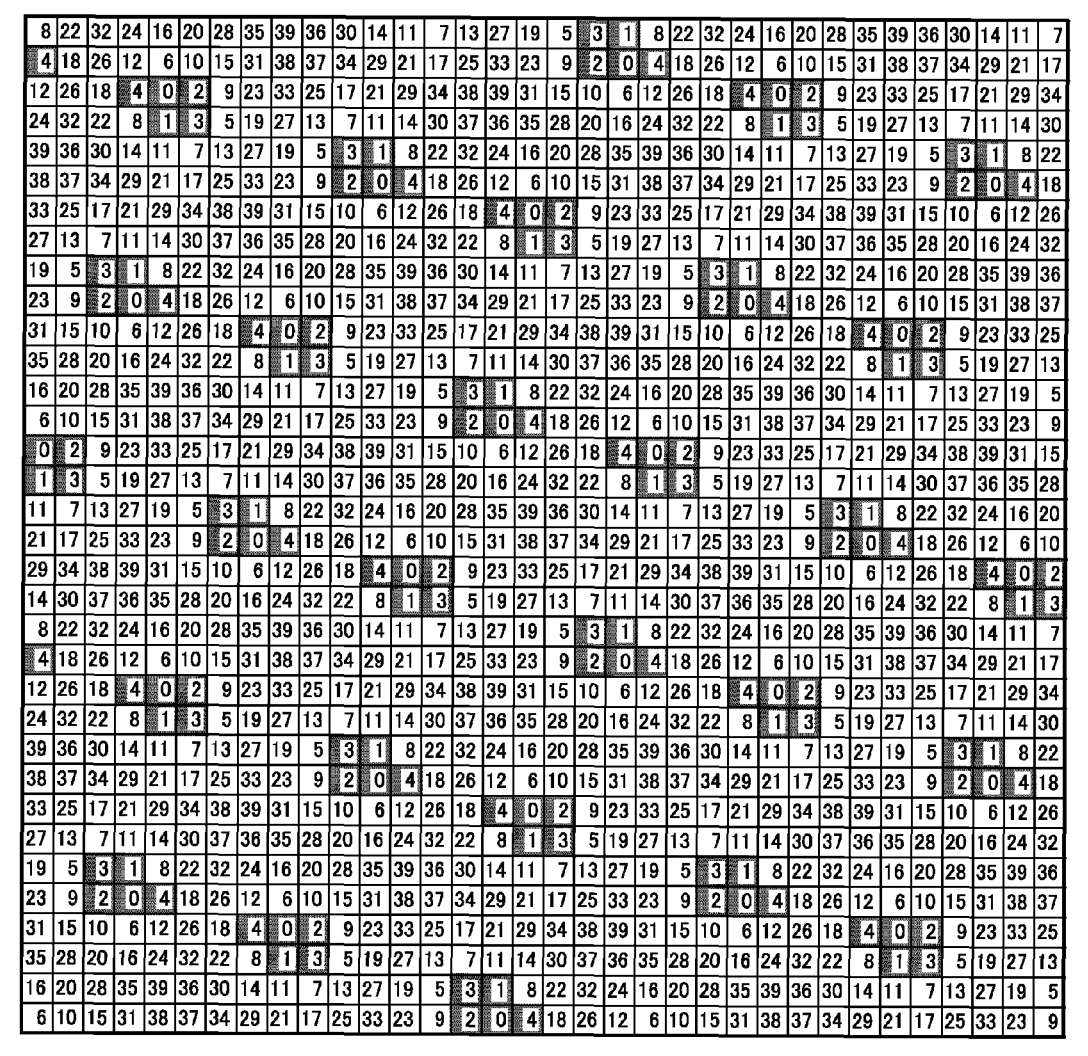

FIG. 10A is an example of a threshold matrix with rotation tolerance at 180° according to the present embodiment. The threshold matrix is the same in size, screen ruling, and screen angle as those of the threshold matrix illustrated in FIG. 6A of the first embodiment. In this case, quantization in 40 tones, i.e., up to a maximum density of 40 is possible. Four dots 1001 to 1004 obtained by applying the threshold matrix to the flat input image data all of which pixel values are 5 are illustrated in gray in the same manner as in FIG. 6A. If the threshold matrix of FIG. 10A is applied, each of the formed four dots 1001 to 1004 are the same in shape as in the first embodiment. The diagonally opposite 2 sets of dots (i.e., the dots 1001 and 1003, and dots 1002 and 1004) are oriented in the opposite directions (i.e., 0° and 180°). In the present embodiment, the threshold matrix in which a threshold is arranged in each submatrix so that such a dot is formed is defined as a unit matrix. FIG. 10B is a resultant image obtained by applying the threshold matrix (i.e., the unit matrix) of FIG. 10A to the flat input image data all of which pixel values are 5 (a reference HT image). FIG. 10C illustrates an image obtained by rotating the reference HT image of FIG. 10B 180° clockwise. In this case, for example, even if a dot oriented in 0° is rotated 180°, another dot oriented in 180° is rotated 180° to be oriented in 0°, whereby the dot pattern to appear is unchanged. The dots with respective orientations are replaced due to rotation, no change in density on a paper sheet which is print output occurs whether the dot is rotated.

Figure 11A:
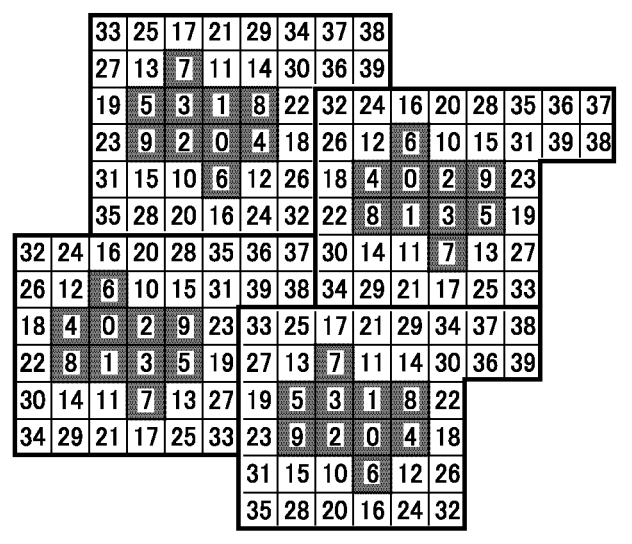
Figure 11B:
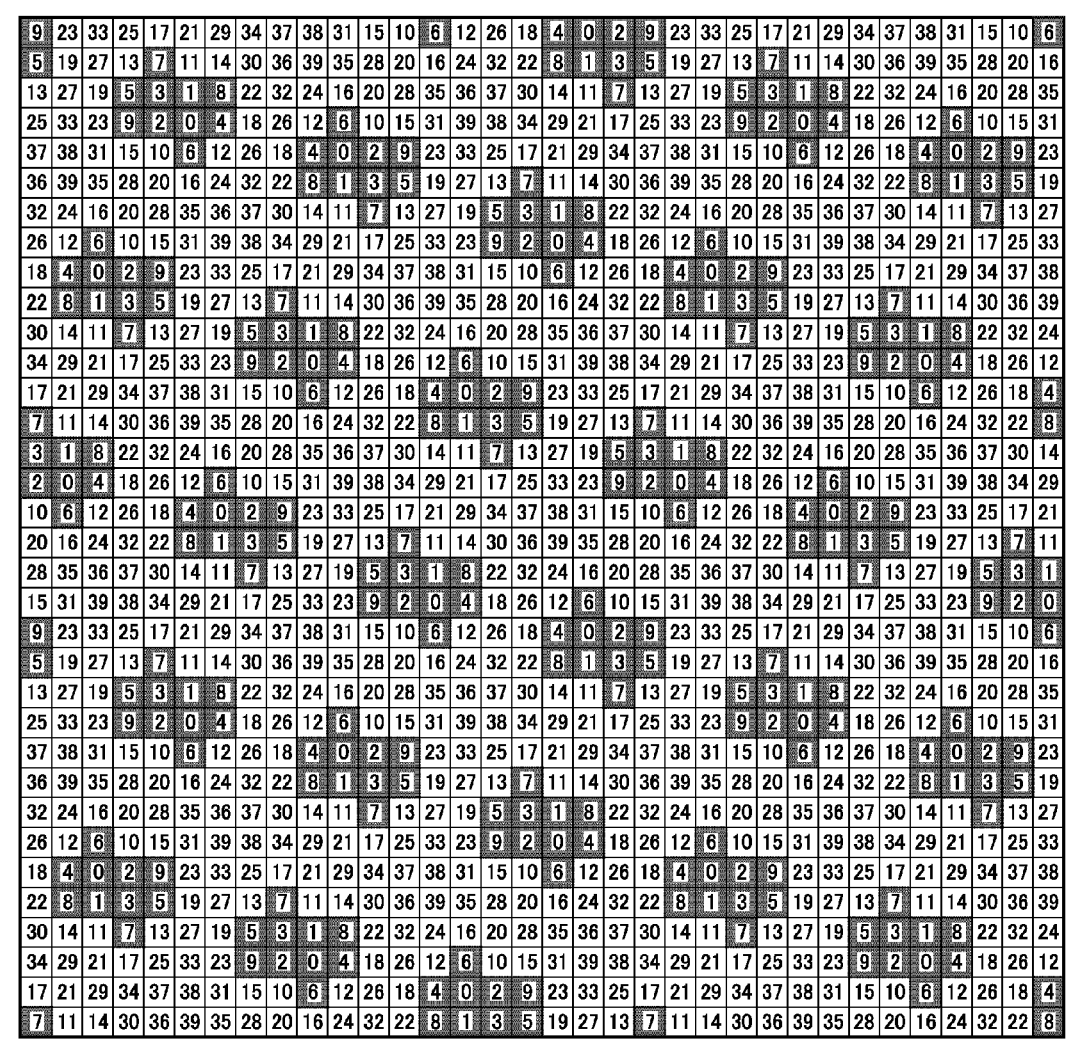
Figure 11C:
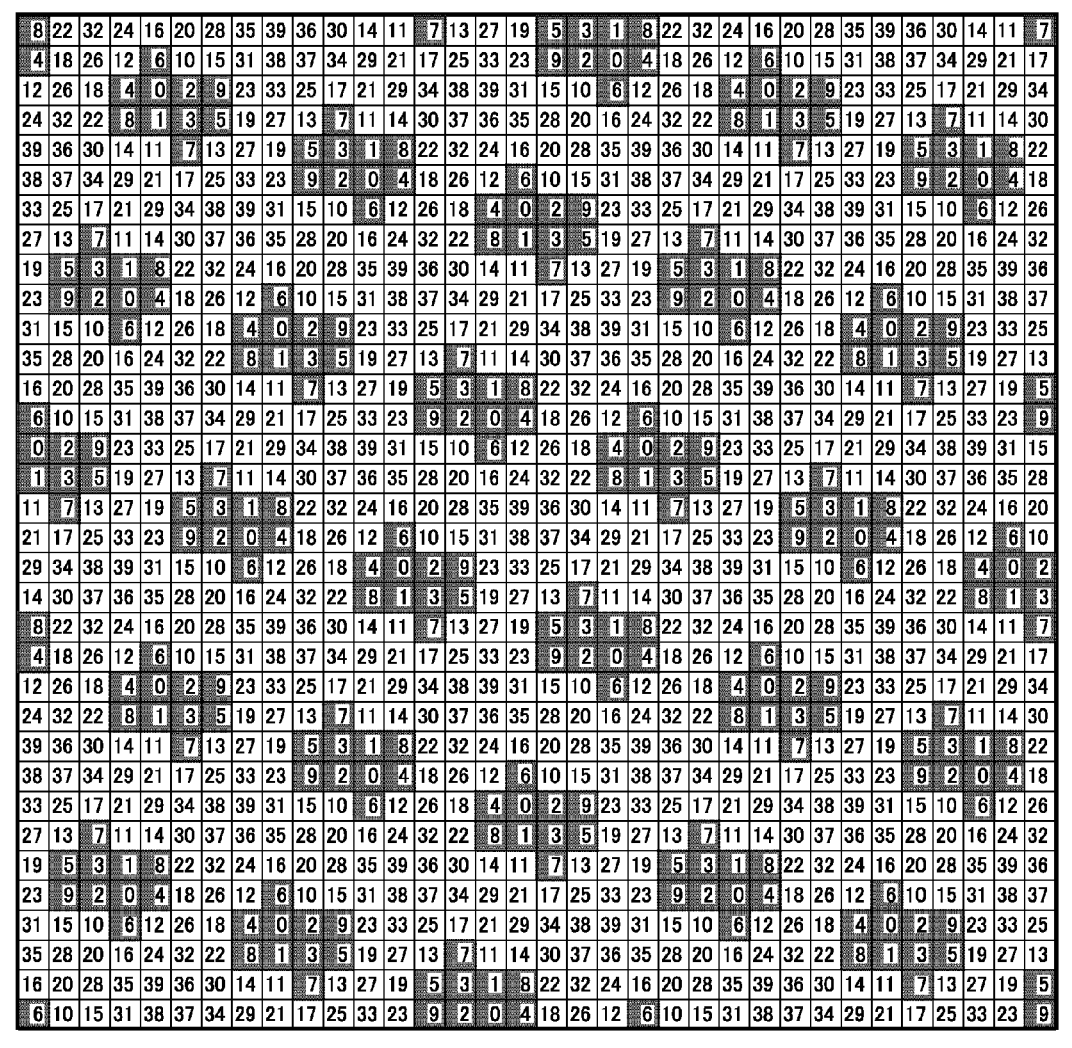

FIGS. 11A to 11C illustrate an example in which a threshold matrix with rotation tolerance according to the present embodiment is applied to a flat input image all of which pixel values are 10. Specifically, FIG. 11A illustrates the same threshold matrix as that illustrated in FIG. 10A, FIG. 11B is a reference HT image obtained by applying the threshold matrix of FIG. 11A, and FIG. 11C is the reference HT image rotated 180°. The size of the dot (i.e., a dot area) becomes twice the size of the dot illustrated in FIGS. 10B and 10C and the shape of the dot coincides completely before and after the rotation. Therefore, in the case of the present embodiment, since it is assumed that the rotation angle is limited to 180°, uniformity of the shape of the dot is further increased and a printed result with higher granularity can be obtained.

Third Embodiment

As described above, in an electrophotographic printing process, for example, a relationship between a laser scanning direction and a rotation direction of a photoconductive drum is exchanged is when a rotation angle is 90° and 270°. A change in density easily occurs between a printed result subject to rotation processing at these angles and a printed result not subject to rotation processing, and a degree of change is large. Conversely, a change in density does not occur easily if the rotation angle is set so that a relationship between the laser scanning direction and the rotation direction of the photoconductive drum is not changed, and a degree of change is small even if it occurs. Then, an embodiment in which it is considered that no change in density exists between 0° and 180° and between 90° and 270°, in which a rotation angle is set to be on a 90° basis (in four directions) as in the first embodiment, and orientations of dots to be formed are limited to be on a 180° basis (in two directions) will be described as a third embodiment.

A basic configuration of the MFP 100, a configuration of the output image processing unit 203, etc., which are the same as those of the first embodiment will not be described. A threshold matrix used for dither processing which is a difference between the first embodiment and the second embodiment will be described mainly.

Figure 12A:
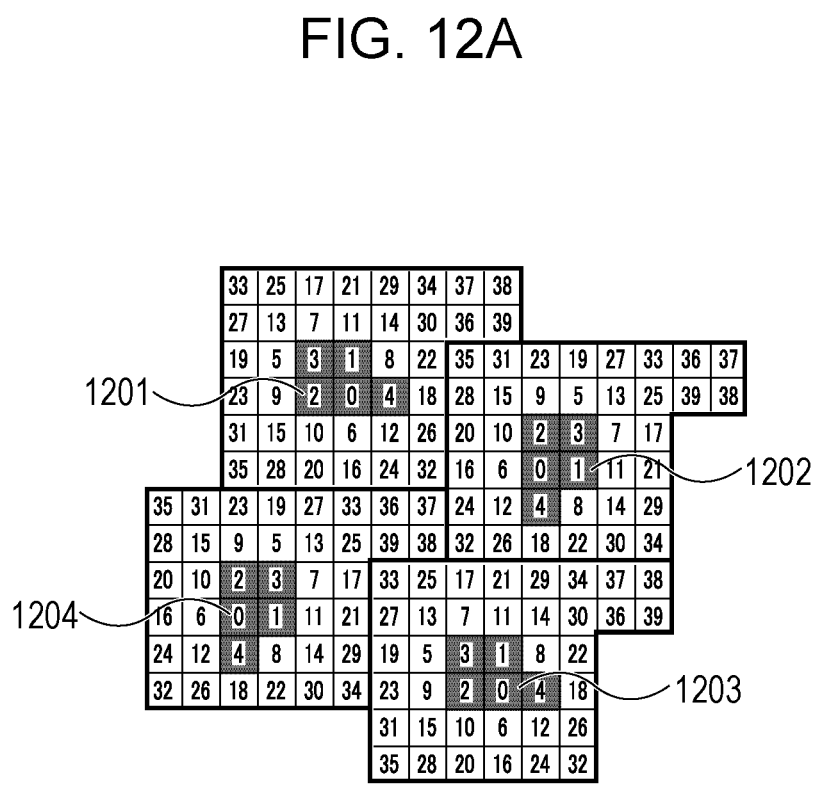
Figure 12B:
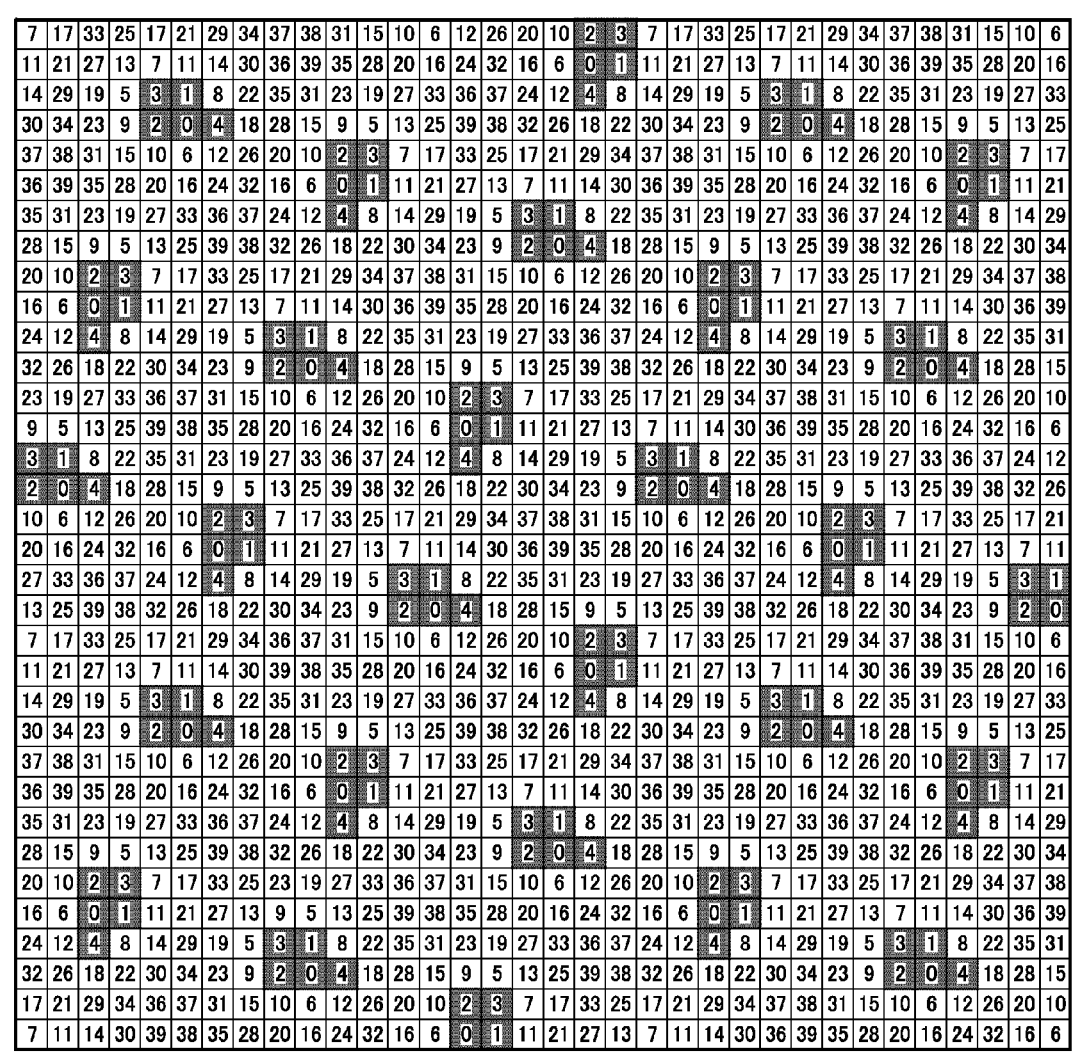
Figure 12C:
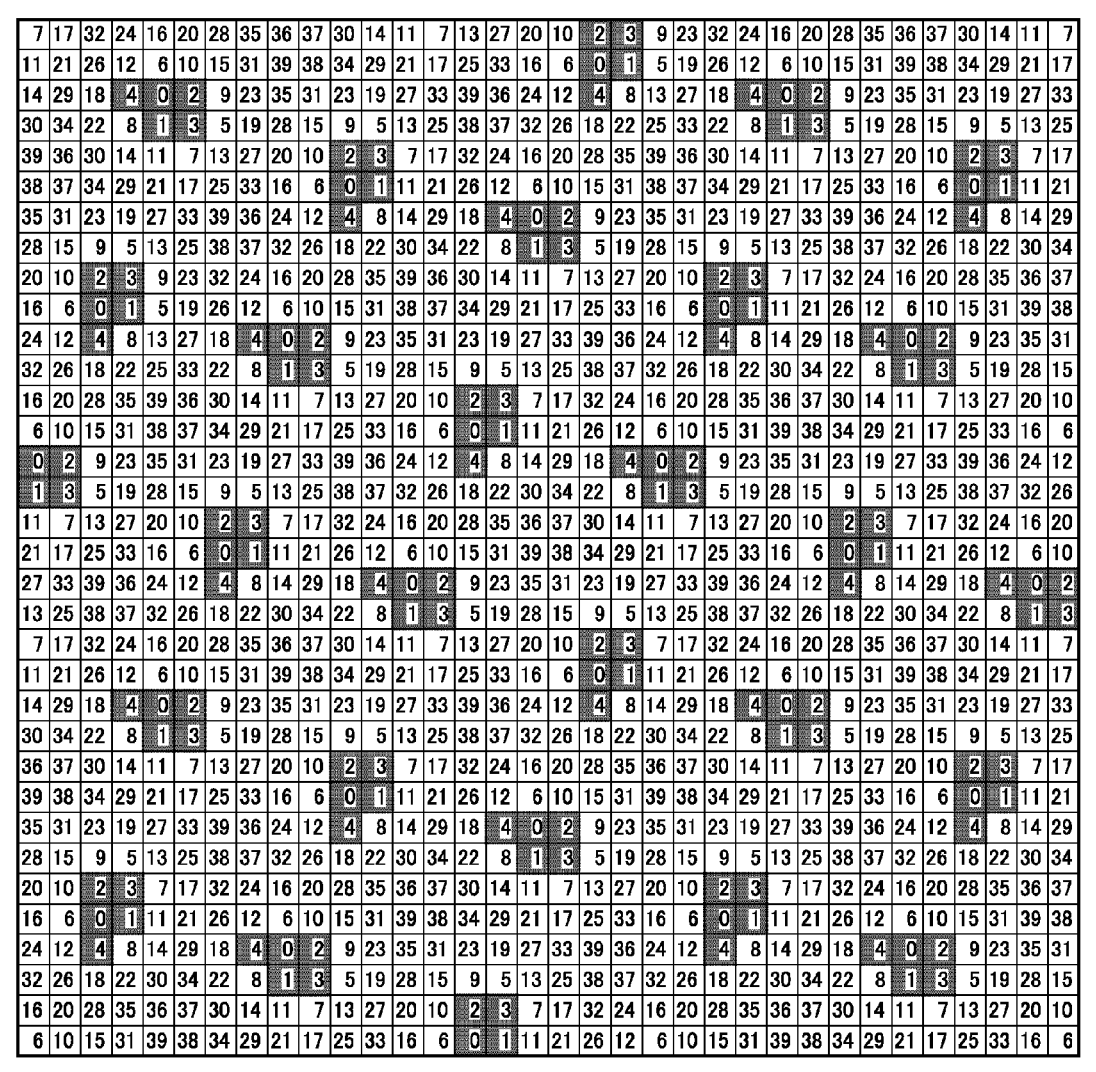

FIG. 12A is an example of a threshold matrix with rotation tolerance according to the present embodiment. The threshold matrix is the same in size, screen ruling, and screen angle as those of the threshold matrix illustrated in FIG. 6A of the first embodiment. In this case, quantization in 40 tones, i.e., up to a maximum density of 40 is possible. Four dots 1201 to 1204 obtained by applying the threshold matrix to the flat input image data all of which pixel values are 5 are illustrated in gray in the same manner as in FIG. 6A. If the threshold matrix of FIG. 12A is applied, each of the formed four dots 1201 to 1204 are the same in shape in the same manner as in the first embodiment. In the threshold matrix of the present embodiment, the diagonally opposite 2 sets of dots (i.e., the dots 1201 and 1203, and dots 1202 and 1204) are oriented in the opposite directions (i.e., 0° and 90°). In the present embodiment, the threshold matrix in which a threshold is arranged in each submatrix so that such a dot is formed is defined as a unit matrix. FIG. 12B is a resultant image obtained by applying the threshold matrix (i.e., the unit matrix) of FIG. 12A to the flat input image data all of which pixel values are 5 (a reference HT image). FIG. 12C illustrates an image obtained by rotating the reference HT image of FIG. 12B 90° clockwise. In this case, the dots oriented in two directions are replaced due to rotation to obtain a dot pattern constituted by either of the same or 180°-rotated dots. If it is assumed that no change in density occurs even if the dots rotate 180°, no change in density will occur on a paper sheet which is print output whether the dots are rotated.

Figure 13A:
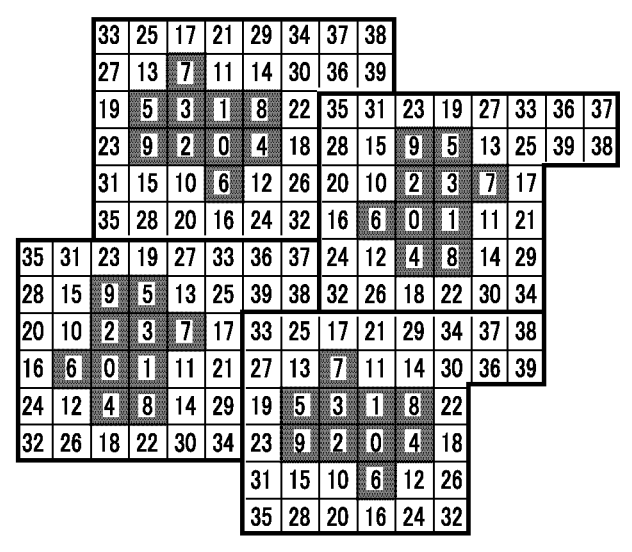
Figure 13B:
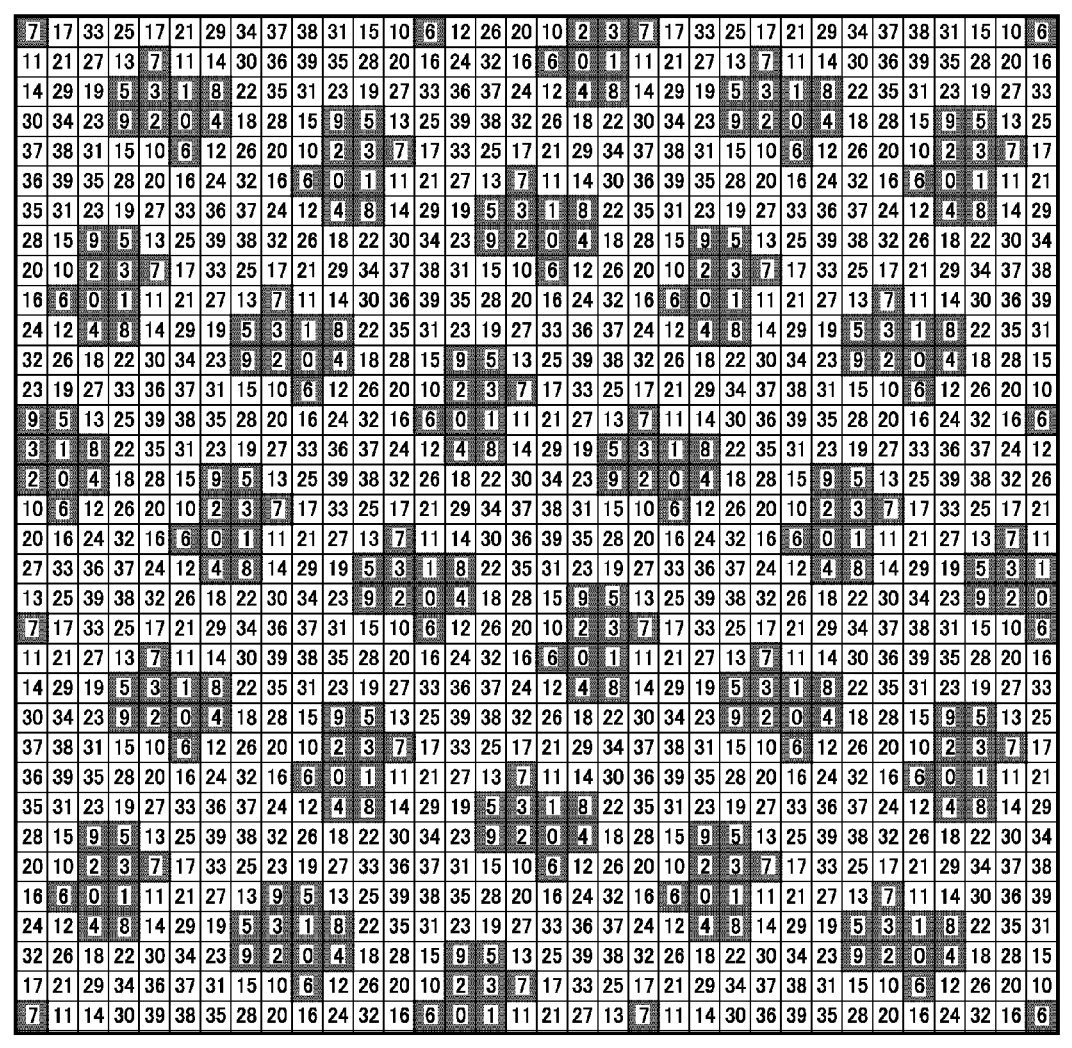
Figure 13C:
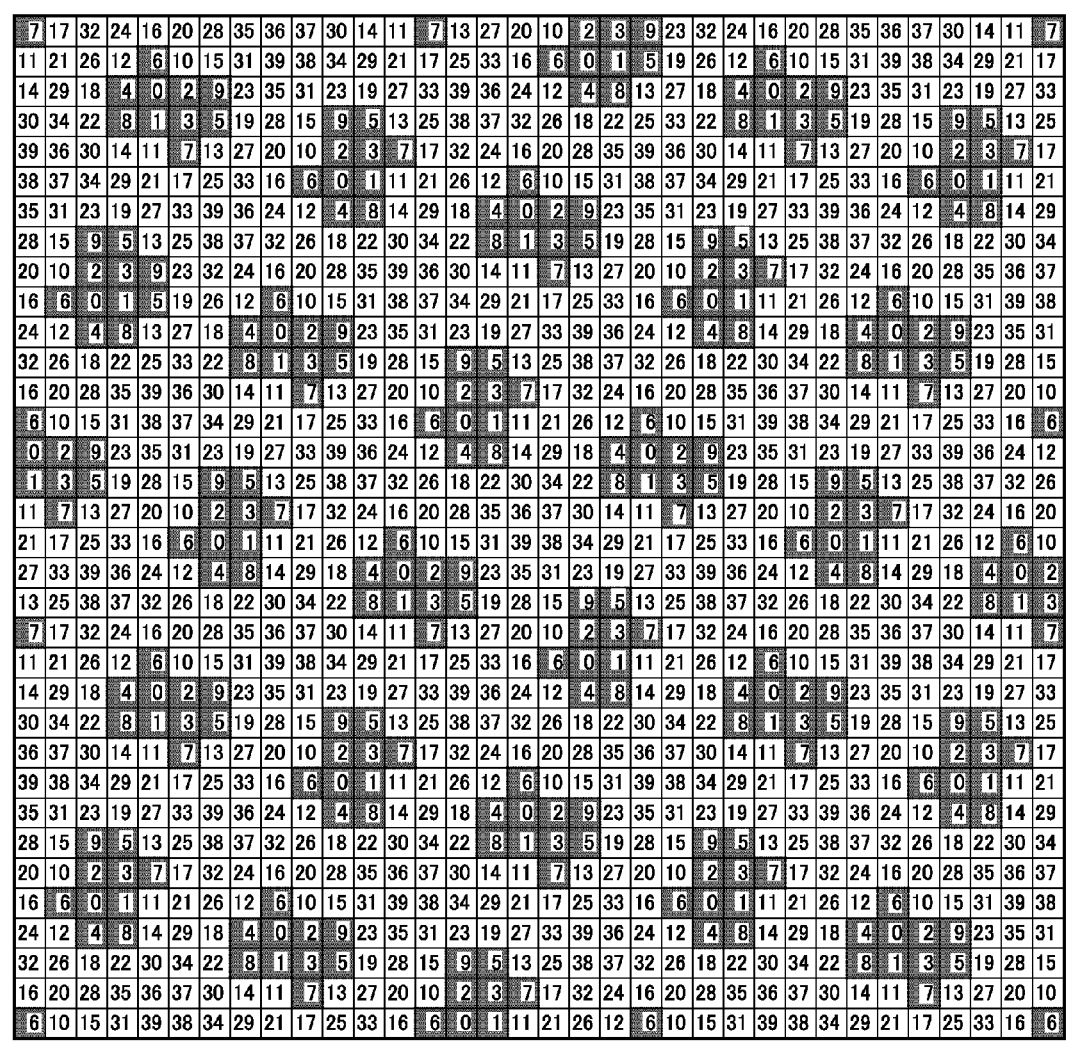

FIGS. 13A to 13C illustrate an example in which a threshold matrix with rotation tolerance according to the present embodiment is applied to a flat input image all of which pixel values are 10. Specifically, FIG. 13A illustrates the same threshold matrix as that illustrated in FIG. 12A, FIG. 13B is a resultant image obtained by applying the threshold matrix of FIG. 13A (a reference HT image), and FIG. 13C is the reference HT image rotated 90°. The size of the dot (i.e., a dot area) becomes twice the size of the dot illustrated in FIGS. 12A to 12C and the shape of the dot coincides completely before and after the rotation. Uniformity of the shape of the dot is further increased and a printed result with higher granularity can be obtained in the same manner as in the second embodiment.

Other Embodiments

The present invention is applicable also to a process in which a program that performs one or more functions of the above-described embodiments is supplied to a system or an apparatus via a network or a storage medium, and one or more processors in a computer of the system or the apparatus read and execute the program. Further, the present invention is implementable in a circuit having one or more functions (e.g., ASIC).

Advantageous Effects of Invention

According to the present invention, even if image data which has been subject to pseudo-halftoning processing is rotated at the time of print output, it is possible to reduce a change in density while keeping favorable continuity of tone.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-227583, filed Nov. 20, 2015, which is hereby incorporated by reference herein in its entirety.

What is claimed is:
1. An image processing apparatus which performs image processing for print processing, comprising:
    a pseudo halftone processing unit configured to perform pseudo halftone processing by dithering with respect to an input image, and generate a halftone image constituted by plural dots, and
    a threshold matrix holding unit configured to hold a threshold matrix used for the pseudo halftone processing,
    wherein
    in the threshold matrix, thresholds are arranged such that the halftone image has a density region in which dots to be formed depending on a density of the input image are not rotational symmetric on a 90° basis, and orientations of the dots differ from each other in the density region.

2. The image processing apparatus according to claim 1, wherein
in the threshold matrix,
the thresholds are arranged such that the dots are oriented in four different directions on a 90° basis in the density region in which the dots are not rotational symmetric on a 90° basis, and
the thresholds are arranged such that the dots are oriented in two directions at 180° in a density region in which the dots are rotational symmetric on a 180° basis in the density region in which the dots are not rotational symmetric on a 90° basis.

3. The image processing apparatus according to claim 2, wherein in the threshold matrix, if the total number of pixels constituting each dot is an even number, the thresholds are arranged such that each dot is rotational symmetric at 180°.

4. The image processing apparatus according to claim 1, further comprising a rotation processing unit configured to perform rotation processing with respect to the halftone image,
wherein a rotation angle in the rotation processing unit is either 90°, 180° or 270°.

5. The image processing apparatus according to claim 4, further comprising a rotation control unit configured to determine the rotation angle of the rotation processing on a 90° basis based on information about the print processing, and control the rotation processing.

6. The image processing apparatus according to claim 5, wherein
the information about the print processing is print setting information to designate a print condition of the input image, and
if double-sided printing is designated and vertical inversion on front and back sides is designated by the print setting information, the rotation control unit controls the rotation processing unit such that the rotation angle becomes 180°.

7. The image processing apparatus according to claim 5, wherein
the information about the print processing is print setting information to designate a print condition of the input image, and
if N in 1 printing or bookbinding printing is designated by the print setting information, the rotation control unit controls the rotation processing unit such that the rotation angle becomes 90°.

8. The image processing apparatus according to claim 5, wherein
the information about the print processing is print setting information to designate a print condition of the input image, and
if a rotation sorting function is set to be effective by the print setting information, the rotation control unit controls the rotation processing unit such that the rotation angle becomes 90° or 270°.

9. The image processing apparatus according to claim 5, wherein
the information about the print processing is information representing running out of paper sheet in a case where an automatic cassette change function is set to be effective in a printing apparatus which performs the print processing,
the rotation control unit controls the rotation processing unit such that the rotation angle becomes 90° or 270° in response to the information representing out of paper sheet.

10. The image processing apparatus according to claim 1, wherein in the threshold matrix, the thresholds are arranged such that diagonally opposite 2 sets of dots are oriented in two directions on a 180° basis.

11. The image processing apparatus according to claim 10,
further comprising a rotation processing unit configured to perform rotation processing with respect to the halftone image data,
wherein a rotation angle in the rotation processing unit is 180°.

12. The image processing apparatus according to claim 1, wherein in the threshold matrix, the thresholds are arranged such that the dots are oriented in two directions on a 180° basis in the density region in which the dots are not rotational symmetric on a 90° basis.

13. The image processing apparatus according to claim 12,
further comprising a rotation processing unit configured to perform rotation processing with respect to the halftone image,
wherein a rotation angle in the rotation processing unit is either 90°, 180° or 270°.

14. A method for performing pseudo halftone processing by dithering with respect to an input image, and generating a halftone image constituted by plural dots, wherein
in a threshold matrix used for the pseudo halftone processing, thresholds are arranged such that the halftone image has a density region in which dots to be formed depending on a density of the input image are not rotational symmetric on a 90° basis, and orientations of the dots differ from each other in the density region.

15. A non-transitory computer readable storage medium storing a program for causing a computer to perform a method for controlling an image processing apparatus which performs pseudo halftone processing by dithering with respect to an input image, and generates a halftone image constituted by plural dots, the control method comprising the steps of;
in a threshold matrix used for the pseudo halftone processing, thresholds are arranged such that the halftone image has a density region in which dots to be formed depending on a density of the input image are not rotational symmetric on a 90° basis, and orientations of the dots differ from each other in the density region.

* * * * *